(12) United States Patent
Siddiqui et al.

(10) Patent No.: US 10,991,112 B2
(45) Date of Patent: Apr. 27, 2021

(54) MULTIPLE SCALE PROCESSING FOR RECEIVED STRUCTURED LIGHT

(71) Applicant: QUALCOMM Incorporated, San Diego, CA (US)

(72) Inventors: Hasib Siddiqui, San Diego, CA (US); James Nash, San Diego, CA (US); Kalin Atanassov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 16/040,157

(22) Filed: Jul. 19, 2018

(65) Prior Publication Data

US 2019/0228535 A1    Jul. 25, 2019

Related U.S. Application Data

(60) Provisional application No. 62/621,425, filed on Jan. 24, 2018.

(51) Int. Cl.
*G06T 7/514*    (2017.01)
*G06T 5/40*    (2006.01)
(Continued)

(52) U.S. Cl.
CPC ............... *G06T 7/514* (2017.01); *G06T 5/40* (2013.01); *G06T 5/50* (2013.01); *G06T 7/521* (2017.01);
(Continued)

(58) Field of Classification Search
CPC .. G06T 5/40; G06T 5/50; G06T 7/514; G06T 7/521; G06T 2207/10028; G06T 2207/20016; G06T 2215/12
See application file for complete search history.

(56) References Cited

U.S. PATENT DOCUMENTS 9,361,698 B1    6/2016    Song et al.
9,609,306 B2    3/2017    Appia
(Continued)

OTHER PUBLICATIONS

Bouman C., et al., "A Multiscale Random Field Model for Bayesian Image Segmentation," IEEE Transactions on Image Processing, IEEE Service Center, Piscataway, NJ, US, vol. 3 (2), Mar. 1, 1994, pp. 162-176, XP000440624.

(Continued)

*Primary Examiner* — Syed Haider
(74) *Attorney, Agent, or Firm* — Polsinelli LLP

(57) ABSTRACT

Aspects relate to processing captured images from structured light systems. An example device may include one or more processors and a memory. The memory may include instructions that, when executed by the one or more processors, cause the device to receive a captured image of a scene from a structured light receiver, analyze one or more first portions of the captured image at a first scale, and analyze one or more second portions of the captured image at a second scale finer than the first scale. The analysis of the one or more second portions may be based on the analysis of the one or more first portions. The instructions further may cause the device to determine for each of the one or more second portions a codeword from a codeword distribution and determine one or more depths in the scene based on the one or more determined codewords.

34 Claims, 14 Drawing Sheets

(51) Int. Cl.
   *G06T 5/50* (2006.01)
   *G06T 7/521* (2017.01)
(52) U.S. Cl.
   CPC .......... *G06T 2207/10028* (2013.01); *G06T 2207/20016* (2013.01); *G06T 2215/12* (2013.01)

(56) References Cited

U.S. PATENT DOCUMENTS

| | | | |
|---|---|---|---|
| 2006/0017720 A1* | 1/2006 | Li | G06T 17/10 345/419 |
| 2014/0132721 A1 | 5/2014 | Martinez Bauza et al. | |
| 2014/0132722 A1* | 5/2014 | Martinez Bauza | G06T 7/521 348/46 |
| 2015/0022632 A1* | 1/2015 | Appia | G06T 7/40 348/43 |
| 2015/0070472 A1* | 3/2015 | Chen | G06T 7/521 348/47 |
| 2016/0150219 A1* | 5/2016 | Gordon | G01B 11/2513 348/46 |
| 2016/0255332 A1* | 9/2016 | Nash | H04N 13/296 348/46 |
| 2018/0010907 A1 | 1/2018 | Forster et al. | |

OTHER PUBLICATIONS

International Search Report and Written Opinion—PCT/US2018/062479—ISA/EPO—dated Feb. 13, 2019.

Tsalakanidou F., et al., "Real-time Acquisition of Depth and Color Images using Structured Light and its Application to 3D Face Recognition," Real-Time Imaging, Academic Press Limited, GB, vol. 11, No. 5-6, Oct. 1, 2005 (Oct. 1, 2005), pp. 358-369, XP005074682, Issn: 1077-2014, DOI: 10.1016/J.RTI.2005.06.006.

Schmalz C., "Robust Single-Shot Structured Light 3D Scanning", Aug. 29, 2011, pp. 1-168.

* cited by examiner

1: $n \leftarrow N$
2: $c \leftarrow \frac{1}{L^{(N)2}}$
3: $\hat{x}_s^{(n)} \leftarrow \underset{k \in \chi^{(n)}}{\mathrm{argmax}}\ y_s^{(n)T} f^{(n)}(k)$
4: $\hat{a}_s^{(n)} \leftarrow c y_s^{(n)T} f^{(n)}(\hat{x}_s^{(n)})$
5: $\hat{b}_s^{(n)} \leftarrow c y_s^{(n)T} \mathbf{1}_{L^{(n)2}}$
6: for $n = (N-1)$ to $0$ do
7:    $c \leftarrow \frac{1}{L^{(n)2}}$
8:    for $s \in S$ do
9:       for $k \in \chi^{(n)}$ do
10:         $a(k) = c y_s^{(n)T} f^{(n)}(k)$
11:       end for
12:       $m \leftarrow \hat{x}_{\partial s}^{(n+1)}$
13:       $\hat{x}_s^{(n)} = \underset{k \in \chi^{(n)}}{\mathrm{argmax}}\ a(k)^2 + 2c\sigma^2 \log p(k|m)$
14:       $\hat{a}_s^{(n)} \leftarrow a(\hat{x}_s^{(n)})$
15:       $\hat{b}_s^{(n)} \leftarrow c y_s^{(n)T} \mathbf{1}_{L^{(n)2}}$
16:    end for
17: end for

FIG. 12

MULTIPLE SCALE PROCESSING FOR RECEIVED STRUCTURED LIGHT

CROSS-REFERENCE TO RELATED APPLICATIONS

This Patent Application claims priority to U.S. Provisional Patent Application No. 62/621,425 entitled "MULTIPLE SCALE PROCESSING FOR RECEIVED STRUCTURED LIGHT" filed on Jan. 24, 2018, which is assigned to the assignee hereof. The disclosure of the prior Application is considered part of and is incorporated by reference in this Patent Application.

TECHNICAL FIELD

This disclosure relates generally to structured light systems and methods, and specifically to multiple scale processing of captured images from structured light systems.

BACKGROUND OF RELATED ART

A device may determine depths or distances of its surroundings using different depth finding systems. In determining depths or distances of objects from the device, the device may transmit one or more wireless signals and measure reflections of the wireless signals. The device may then use the reflections to generate a depth map illustrating or otherwise indicating the depths of objects from the device. One depth finding system is a structured light system.

For a structured light system, wireless signals in a known pattern of points are transmitted. The wireless signals may be near-infrared (NIR) signals or other frequency signals of the electromagnetic spectrum. The reflections of the wireless signals may be captured, and the captured signals may be processed in determining depths of objects from the device. Constraints on the resolution of the pattern and the transmission power for the signals of conventional structured light systems limit the accuracy of the determined depths.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to processing captured images from structured light systems. An example device may include one or more processors and a memory. The memory may include instructions that, when executed by the one or more processors, cause the device to receive a captured image of a scene from a structured light receiver, analyze one or more first portions of the captured image at a first scale, and analyze one or more second portions of the captured image at a second scale finer than the first scale. The analysis of the one or more second portions may be based on the analysis of the one or more first portions. The instructions further may cause the device to determine for each of the one or more second portions a codeword from a codeword distribution and determine one or more depths in the scene based on the one or more determined codewords.

In another example, a method is disclosed. The example method includes receiving a captured image of a scene from a structured light receiver, analyzing one or more first portions of the captured image at a first scale, and analyzing one or more second portions of the captured image at a second scale finer than the first scale. The analysis of the one or more second portions may be based on the analysis of the one or more first portions. The method further may include determining for each of the one or more second portions a codeword from a codeword distribution and determining one or more depths in the scene based on the one or more determined codewords.

In a further example, a non-transitory computer-readable medium is disclosed. The non-transitory computer-readable medium may store instructions that, when executed by one or more processors, cause a device to receive a captured image of a scene from a structured light receiver, analyze one or more first portions of the received measurements at a first scale, and analyze one or more second portions of the received measurements at a second scale finer than the first scale. The analysis of the one or more second portions may be based on the analysis of the one or more first portions. The instructions further may cause the device to determine for each of the one or more second portions a codeword from a codeword distribution and determine one or more depths in the scene based on the one or more determined codewords.

In another example, a device is disclosed. The device includes means for receiving a captured image of a scene from a structured light receiver, means for analyzing one or more first portions of the captured image at a first scale, and means for analyzing one or more second portions of the captured image at a second scale finer than the first scale. The analysis of the one or more second portions may be based on the analysis of the one or more first portions. The device further may include means for determining for each of the one or more second portions a codeword from a codeword distribution and means for determining one or more depths in the scene based on the one or more determined codewords.

BRIEF DESCRIPTION OF THE DRAWINGS

Aspects of the present disclosure are illustrated by way of example, and not by way of limitation, in the figures of the accompanying drawings and in which like reference numerals refer to similar elements.

FIG. 12 is a depiction of pseudo code for an example implementation of the multiscale matched filtering process that may be used to determine, for each bit of the captured image, confidences for the codewords in the codeword distribution.

DETAILED DESCRIPTION

Figure 1:
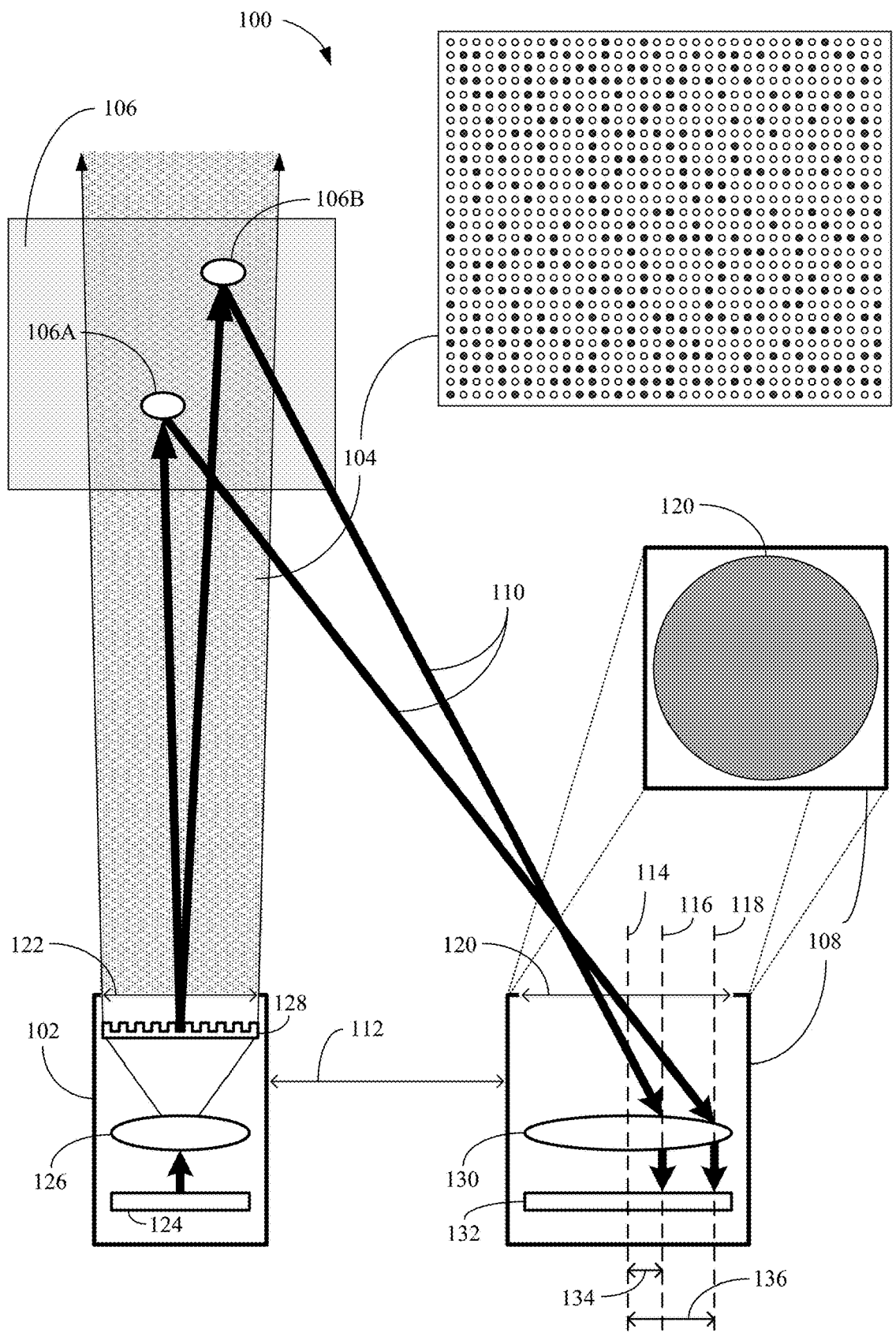
FIG. 1 is a depiction of an example structured light system.

Aspects of the present disclosure relate to structured light systems for determining depths. A structured light system may transmit light in a predefined distribution of points (or another suitable shape of focused light). The points of light may be projected on to a scene, and the reflections of the points of light may be received by the structured light system. Depths of objects in a scene may be determined by comparing the pattern of the received light and the pattern of the transmitted light. In comparing the patterns, a portion of the predefined distribution for the transmitted light may be identified in the received light.

The predefined distribution of transmitted light may be divided into a plurality of portions called codewords. The codewords may be larger (include more points of light) to increase the probability of identifying a codeword in the pattern of received light. Alternatively, the codewords may be smaller (include less points of light) to increase the number of depths that may be determined for the scene (increase the resolution), but the probability of identifying a codeword in the pattern of received light may be decreased compared to larger codewords. Smaller codewords are considered finer scale codewords than larger codewords (coarser scale codewords). When the received light from the structured light system is compared to the predefined distribution of the transmitted light, codewords of a specific size or scale are attempted to be identified in the received light, causing a trade-off between reliably identifying codewords by using coarser scale codewords or increasing the resolution by using finer scale codewords. Therefore, improvements to structured light systems are needed for increasing the resolution while still reliably identifying codewords.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processes, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device (such as security systems, smartphones, tablets, laptop computers, vehicles, drones, or other devices) with are coupled to one or more structured light systems. While described below with respect to a device having or coupled to one structured light system, aspects of the present disclosure are applicable to devices having any number of structured light systems (including none, where structured light information is provided to the device for processing), and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments.

For example, a system may be implemented on one or more printed circuit boards or other substrates, and may have movable or static components. While the below description and examples use the term "system" to describe various aspects of this disclosure, the term "system" is not limited to a specific configuration, type, or number of objects.

FIG. 1 is a depiction of an example structured light system 100. The structured light system 100 may be used to generate a depth map (not pictured) of a scene 106. The structured light system 100 may include at least a projector or transmitter 102 and a receiver 108. The projector or transmitter 102 may be referred to as a "transmitter," "projector," "emitter," and so on, and should not be limited to a specific transmission component. Similarly, the receiver 108 may also be referred to as a "detector," "sensor," "sensing element," "photodetector," and so on, and should not be limited to a specific receiving component.

The transmitter 102 may be configured to project a codeword distribution 104 of light points onto the scene 106, as described below in connection with FIG. 3. In some example implementations, the transmitter 102 may include one or more laser sources 124, a lens 126, and a light modulator 128. The transmitter 102 also may include an aperture 122 from which the transmitted light escapes the transmitter 102. In some implementations, the transmitter 102 may further include a diffractive optical element (DOE) to diffract the emissions from one or more laser sources 124 into additional emissions. In some aspects, the light modulator 128 (to adjust the intensity of the emission) may comprise a DOE. The codeword distribution 104 may be hardcoded on the structured light system 100 (e.g., at the transmitter 102) so that the pattern and other characteristics of the codeword distribution 104 do not vary, as will be further described in connection with FIG. 3. In projecting the codeword distribution 104 of light points onto the scene 106, the transmitter 102 may transmit one or more lasers from the laser source 124 through the lens 126 (and/or through a DOE or light modulator 128) and onto the scene 106. The transmitter 102 may be positioned on the same reference plane as the receiver 108, and the transmitter 102 and the receiver 108 may be separated by a distance called the baseline (112).

The scene 106 may include objects at different depths from the structured light system (such as from the transmitter 102 and the receiver 108). For example, objects 106A and 106B in the scene 106 may be at different depths. The receiver 108 may be configured to receive, from the scene 106, reflections 110 of the transmitted codeword distribution 104 of light points. To receive the reflections 110, the receiver 108 may capture an image. When capturing the image, the receiver 108 may receive the reflections 110, as well as (i) other reflections of the codeword distribution 104 of light points from other portions of the scene 106 at different depths and (ii) ambient light. Noise may also exist in the captured image.

In some example implementations, the receiver 108 may include a lens 130 to focus or direct the received light (including the reflections 110 from the objects 106A and 106B) on to the sensor 132 of the receiver 108. The receiver 108 also may include an aperture 120 to restrict the direction from which the receiver 108 may receive light. Assuming for the example that only the reflections 110 are received, depths of the objects 106A and 106B may be determined based on the baseline 112, displacement and distortion of the codeword distribution 104 in the reflections 110, and intensities of the reflections 110. For example, the distance 134 along the sensor 132 from location 116 to the center 114 may be used in determining a depth of the object 106B in the scene 106. Similarly, the distance 136 along the sensor 132 from location 118 to the center 114 may be used in determining a depth of the object 106A in the scene 106. The distance along the sensor 132 may be measured in terms of number of pixels of the sensor 132 or a distance (such as millimeters).

In some example implementations, the sensor 132 may include an array of photodiodes (such as avalanche photodiodes) for capturing an image. To capture the image, each photodiode in the array may capture the light that hits the photodiode and may provide a value indicating the intensity of the light (a capture value). The image therefore may be the capture values provided by the array of photodiodes.

In addition or alternative to the sensor 132 including an array of photodiodes, the sensor 132 may include a complementary metal-oxide semiconductor (CMOS) sensor. To capture the image by a photosensitive CMOS sensor, each pixel of the sensor may capture the light that hits the pixel and may provide a value indicating the intensity of the light. In some example implementations, an array of photodiodes may be coupled to the CMOS sensor. In this manner, the electrical impulses generated by the array of photodiodes may trigger the corresponding pixels of the CMOS sensor to provide capture values.

The sensor 132 may include at least a number of pixels equal to the number of light points in the codeword distribution 104. For example, the array of photodiodes or the CMOS sensor may include a number of photodiodes or a number of pixels, respectively, corresponding to the number of light points in the codeword distribution 104. The sensor 132 logically may be divided into groups of pixels or photodiodes (such as 4×4 groups) that correspond to a size of a bit of the codeword distribution, as described below in connection with FIG. 3. The group of pixels or photodiodes is also referred to as a bit, and the portion of the captured image from a bit of the sensor 132 may also be referred to as a bit. In some example implementations, the sensor 132 may include the same number of bits as the codeword distribution 104.

As illustrated, the distance 134 (corresponding to the reflections 110 from the object 106B) is less than the distance 136 (corresponding to the reflections 110 from the object 106A). Using triangulation based on the baseline 112 and the distances 134 and 136, the differing depths of objects 106A and 106B in the scene 106 may be determined in generating a depth map of the scene 106. Determining the depths may further include determining a displacement or a distortion of the codeword distribution 104 in the reflections 110, as described below in connection with FIG. 3.

Although a number of separate components are illustrated in FIG. 1, one or more of the components may be implemented together or include additional functionality. All described components may not be required for a structured light system 100, or the functionality of components may be separated into separate components. Therefore, the present disclosure should not be limited to the example structured light system 100.

Figure 2:
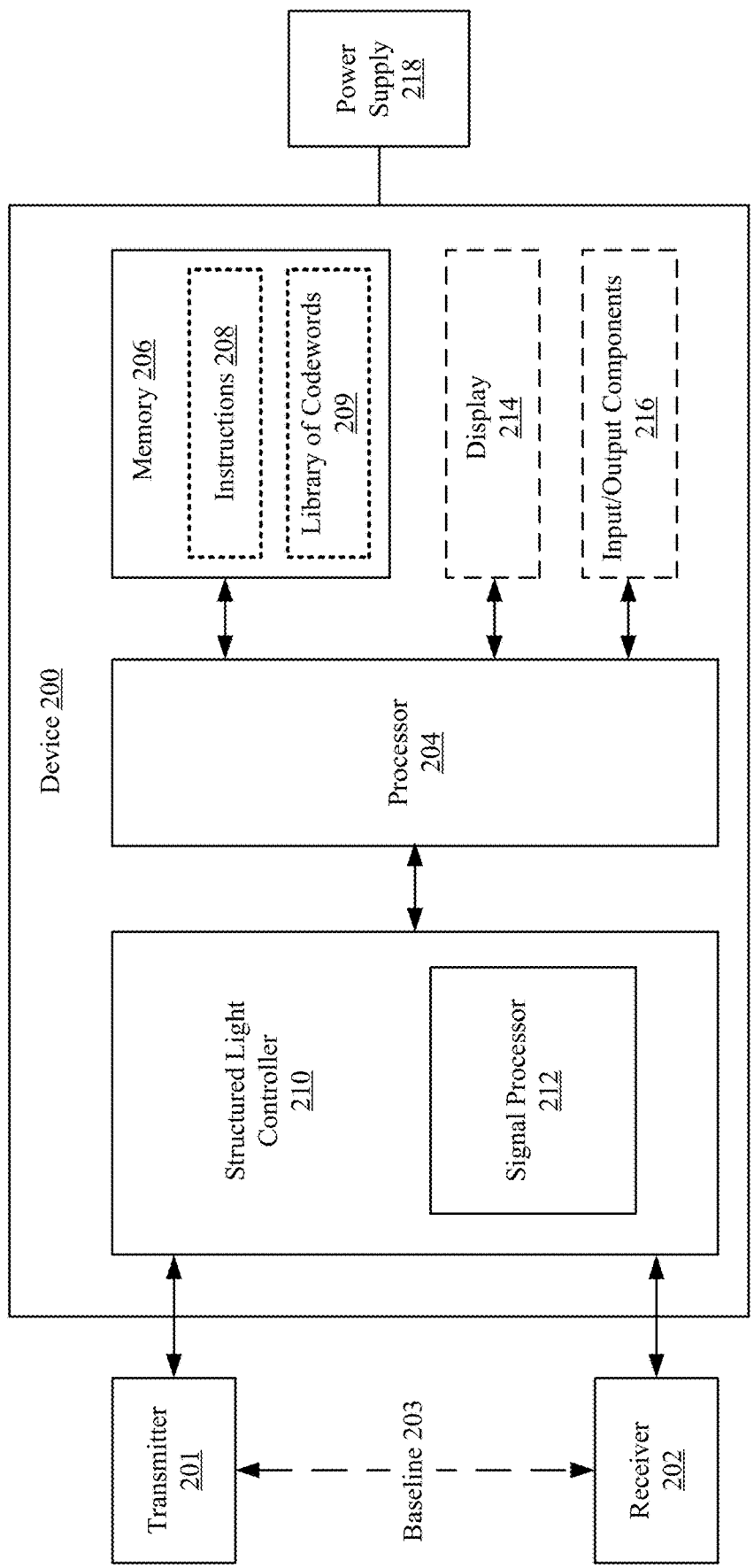
FIG. 2 is a block diagram of an example device including a structured light system.

FIG. 2 is a block diagram of an example device 200 including a structured light system (such as structured light system 100 in FIG. 1). In some other examples, the structured light system may be coupled to the device 200, or information from a structured light system may be provided to device 200 for processing. The example device 200 may include or be coupled to a transmitter 201 (such as transmitter 102 in FIG. 1) and a receiver 202 (such as receiver 108 in FIG. 1) separated from the transmitter 201 by a baseline 203. The example device 200 may also include a processor 204, a memory 206 storing instructions 208, and a structured light controller 210 (which may include one or more signal processors 212). The device 200 may optionally include (or be coupled to) a display 214 and a number of input/output (I/O) components 216. The device 200 may include additional features or components not shown. For example, a wireless interface, which may include a number of transceivers and a baseband processor, may be included for a wireless communication device. The transmitter 201 and the receiver 202 may be part of a structured light system (such as structured light system 100 in FIG. 1) controlled by the structured light controller 210 and/or the processor 204. The device 200 may include or be coupled to additional structured light systems or may include a different configuration for the structured light system. For example, the device 200 may include or be coupled to additional receivers (not shown) for capturing multiple images of a scene. The disclosure should not be limited to any specific examples or illustrations, including the example device 200.

The memory 206 may be a non-transient or non-transitory computer readable medium storing computer-executable instructions 208 to perform all or a portion of one or more operations described in this disclosure. The memory 206 may also store a library of codewords 209 for the codeword distribution of light transmitted by the transmitter 201. The device 200 may also include a power supply 218, which may be coupled to or integrated into the device 200.

The processor 204 may be one or more suitable processors capable of executing scripts or instructions of one or more software programs (such as instructions 208) stored within the memory 206. In some aspects, the processor 204 may be one or more general purpose processors that execute instructions 208 to cause the device 200 to perform any number of functions or operations. In additional or alternative aspects, the processor 204 may include integrated circuits or other hardware to perform functions or operations without the use of software. While shown to be coupled to each other via the processor 204 in the example of FIG. 2, the processor 204, the memory 206, the structured light controller 210, the optional display 214, and the optional I/O components 216 may be coupled to one another in various arrangements. For example, the processor 204, the memory 206, the structured light controller 210, the optional display 214, and/or the optional I/O components 216 may be coupled to each other via one or more local buses (not shown for simplicity).

The display 214 may be any suitable display or screen allowing for user interaction and/or to present items (such as a depth map or a preview image of the scene) for viewing by a user. In some aspects, the display 214 may be a touch-sensitive display. The I/O components 216 may be or include any suitable mechanism, interface, or device to receive input (such as commands) from the user and to provide output to the user. For example, the I/O components 216 may include (but are not limited to) a graphical user interface, keyboard, mouse, microphone and speakers, squeezable bezel or border of the device 200, physical buttons located on device 200, and so on. The display 214 and/or the I/O components 216 may provide a preview image or depth map of the scene to a user and/or receive a user input for adjusting one or more settings of the device 200 (such as adjusting the intensity of the emissions by transmitter 201, adjusting the scale of the codewords used for determining depths, and so on).

The structured light controller 210 may include a signal processor 212, which may be one or more processors to process the image captured by the receiver 202 and/or control the transmitter 201 (such as control the intensity of the emissions). In some aspects, the signal processor 212 may execute instructions from a memory (such as instructions 208 from the memory 206 or instructions stored in a separate memory coupled to the signal processor 212). In other aspects, the signal processor 212 may include specific hardware for operation. The signal processor 212 may alternatively or additionally include a combination of specific hardware and the ability to execute software instructions.

Figure 3:
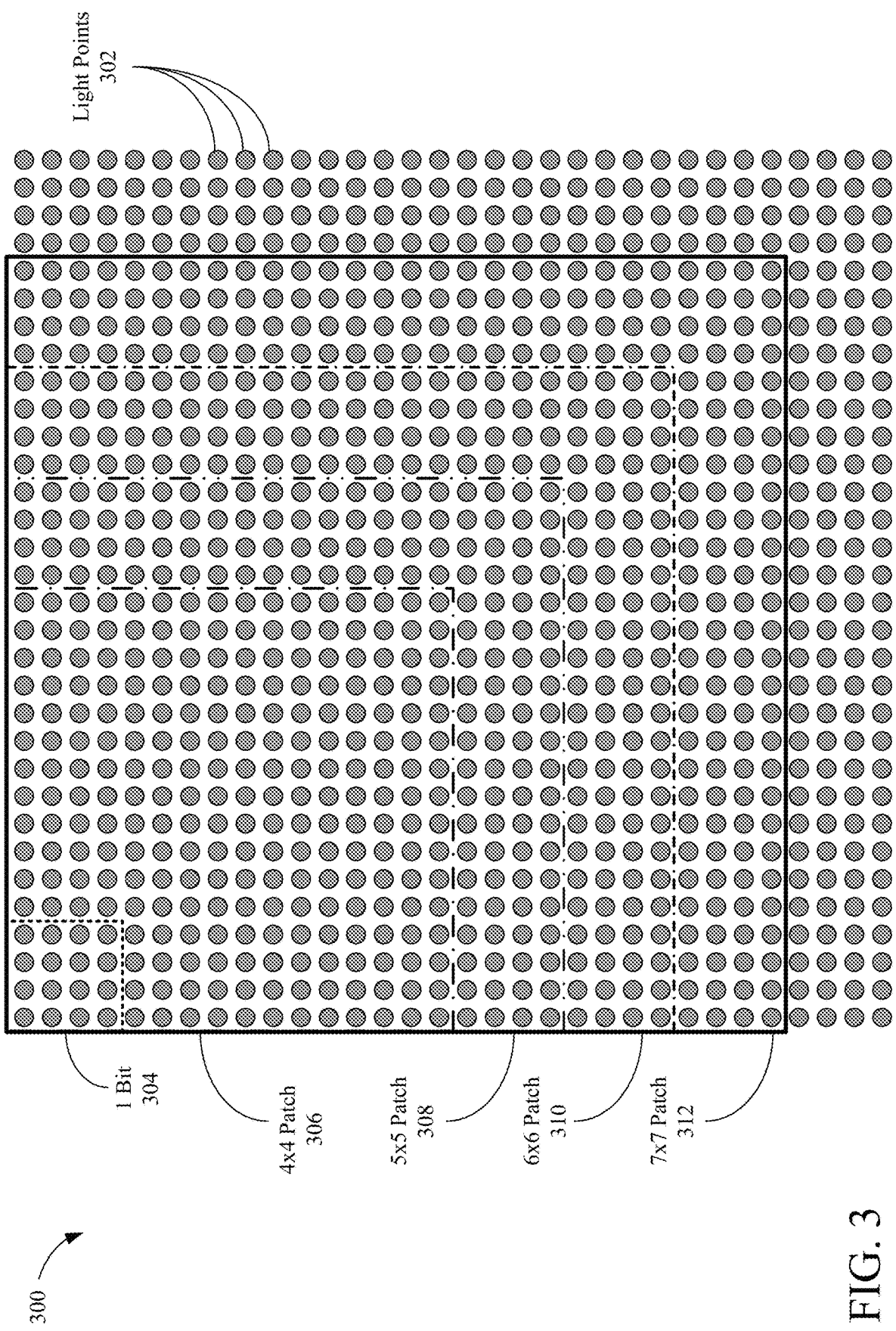
FIG. 3 is a depiction of a portion of an example codeword distribution for a structured light system.

FIG. 3 is a depiction of a portion of an example codeword distribution 300 for a structured light system (such as the structured light system 100 in FIG. 1). The example codeword distribution 300 may be an example portion of the codeword distribution 104 in FIG. 1. The pattern comprises a plurality of single light points 302 that may be considered on or off (1 or 0, respectively). A single light point 302 may be considered off or 0 if no light is transmitted from the single light point 302. In one example, the DOE may be configured to block light transmissions from one or more light points 302. In another example, a light source (such as a laser source 124 in FIG. 1) may be off or otherwise prevented from transmitting. In this manner, the transmitter may be considered to transmit a 0 at a light point 302 when no light is transmitted from the light point 302. Similarly, a single light point 302 may be considered on or 1 if light is transmitted from the single light point 302. For example, the DOE may be configured to allow light to be transmitted from one or more light points 302, or a light source may be on and transmitting light at one or more light points 302. In this manner, the transmitter may be considered to transmit a 1 from a single light point 302 when light is transmitted from the light point 302. While the codeword distribution 300 is not illustrated as including 0s and 1s (on or off light points), the codeword distribution 104 in FIG. 1 is illustrated as including example 0s and 1s (with dark circles representing 0s and light circles representing 1s). As described above regarding the codeword distribution 104 in FIG. 1, the codeword distribution may be hardcoded. In this manner, a light point 302 that is on or 1 is always on or 1 during transmission (i.e., the light point 302 does not change to off or 0). Similarly, a light point 302 that is off or 0 is always off or 0 during transmission (i.e., the light point 302 does not change to on or 1).

In some example implementations, the light points 302 are logically grouped into bits of 4 points×4 points (such as bit 304). In some further example implementations, the smallest codeword (to provide the highest resolution for depth maps or depth determinations) may be a 4-bit×4-bit patch (such as 4×4 patch 306). If the smallest codeword is size 4×4, codewords of size 4×4 may be considered the finest scale since the smallest codeword size may provide the highest resolution. The finest scale may be called scale 0, with coarser scales indicated by scale numbers greater than 0 (such as scale 1, scale 2, and so on). Additional codeword sizes (at coarser scales and thus providing lower resolutions) may include a 5×5 patch (such as 5×5 patch 308, scale 1), a 6×6 patch (such as 6×6 patch 310, scale 2), a 7×7 patch (such as 7×7 patch 312, scale 3), or other size patches (not illustrated). Other size codewords (either smaller or larger) may exist, and the present disclosure should not be limited to the provided examples.

Since the codeword distribution 104 is hardcoded, the pattern of light points of the codeword distribution 104 is known. Referring back to FIG. 2, the device 200 may store a library of codewords 209, which may include all codewords in the codeword distribution 104 (in FIG. 1) for all scales allowed by the structured light system. For example, if the allowed scales are 0 to 3, the library of codewords 209 may include all codewords existing in the codeword distribution 104 for scales 0 to 3 (such as all size 4×4 patches through size 7×7 patches of the codeword distribution 300 as shown in FIG. 3).

Figure 4:
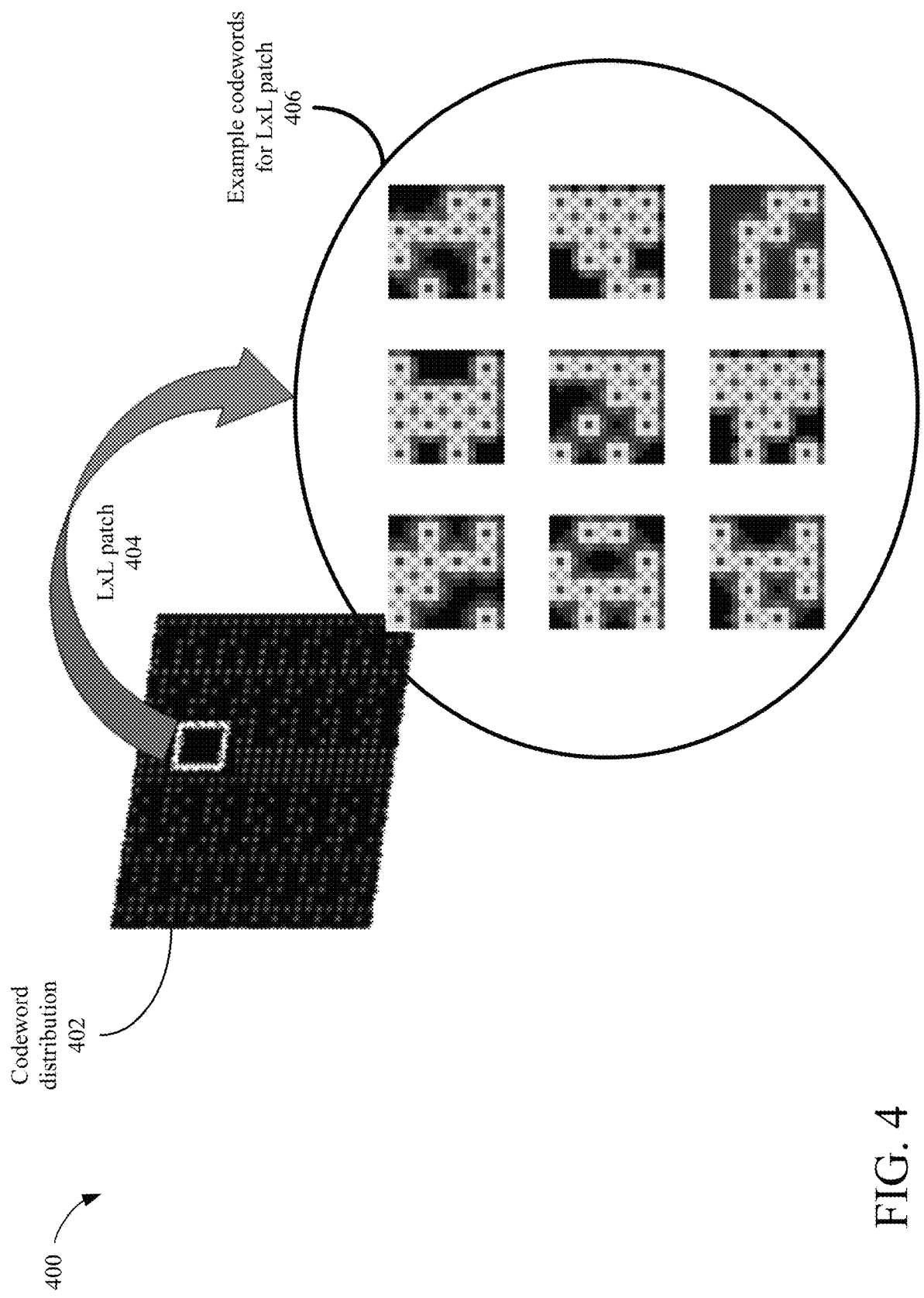
FIG. 4 is a depiction of example codewords for an L×L patch of the codeword distribution.

FIG. 4 is a depiction 400 of example codewords 406 for an L×L patch 404 of a codeword distribution 402. The codeword distribution 402 may be the same as the codeword distribution 104 (in FIG. 1) or the codeword distribution 300 (in FIG. 3). The L×L patch 404 may correspond to the specific size of scale n codewords (where L is related to n). With the codeword distribution 402 hardcoded, the library of codewords 209 (in FIG. 2) may include each of the example codewords 406. For a structured light system, the device 200 may determine if one of the example codewords 406 exists in an L×L bit patch of the captured image. For example, the device 200 may identify a scale 0 codeword that exists in a 4×4 bit patch of the captured image. The determined codewords may be used in determining depths of objects in the scene (such as in generating a depth map). However, ambient light or energy may be received by the receiver 202 in addition to reflections of the transmitted codeword distribution 402 of light points. For example, for a near-infrared (NIR) structured light system, bright outdoor daylight may provide more interference for receiving the reflections of the transmitted light than interference provided by darker, indoor lighting. Noise also may exist in the captured image from the receiver 202, which may interfere with receiving the reflections of the transmitted light. The interference may obfuscate portions of the codeword distribution 402 existing in the captured image and may cause the device 200 to not accurately determine one or more codewords of the codeword distribution 402 existing in the captured image.

When more interference exists (such as bright outdoor lighting for a NIR structured light system), the device 200 may use coarser scale codewords for generating a depth map. Coarser scale codewords include more light points than finer scale codewords, thus providing more tolerance for incorrectly determined light points in the captured image and providing a greater probability in determining a codeword exists in the captured image. In this manner, a depth map generated using coarser scale codewords may have less holes (or portions of invalid data) than a depth map generated using finer scale codewords. Alternatively, when less interference exists (such as dark indoor settings for a NIR structured light system), the device 200 may use finer scale codewords for generating a depth map. Finer scale codewords include less light points than coarser scale codewords, thus providing the ability to determine more codewords in the captured image (since more finer scale codewords than coarser scale codewords exist in a codeword distribution). In this manner, a depth map generated using finer scale codewords may have a higher resolution than a depth map generated using coarser scale codewords.

Figure 5:
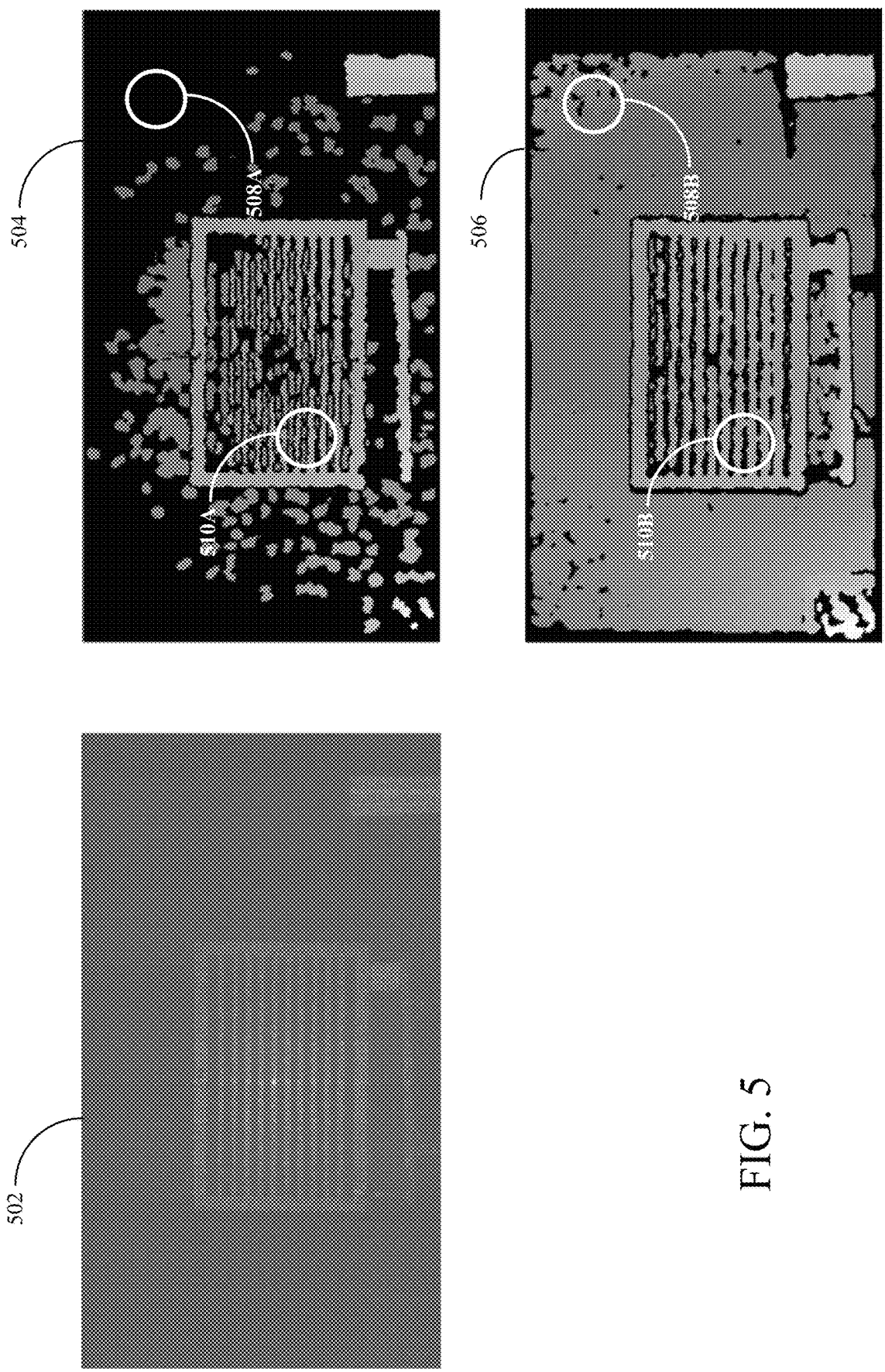
FIG. 5 is a depiction of an example captured image from a structured light receiver, and a depiction of a first depth map generated from the captured image using 4×4 codewords and a second depth map generated from the captured image using 7×7 codewords.

FIG. 5 is a depiction of an example captured image 502 from a structured light receiver, and a depiction of a first depth map 504 generated from the captured image 502 using 4×4 codewords and a second depth map 506 generated from the captured image 502 using 7×7 codewords. Black portions of the depth maps 504 and 506 indicate portions of the captured image 502 in which a codeword could not be determined. The portions include invalid or no data, and the portions may be called holes. A strip of black exists on the right side of both depth maps 504 and 506 and corresponds to a strip on the right side of the captured image 502. The strip may be caused by the corresponding portion of the sensor not receiving reflections of the transmitted light during image capture. For example, referring back to FIG. 1, the aperture 120 of the receiver 108 may limit the angle and origin of light able to reach the sensor 132. With the receiver 108 separated from the transmitter 102 by the baseline 112, a left portion of the sensor 132 may not receive reflections of the transmitted light. Increasing the baseline 112 may increase the portion of the sensor 132 not receiving reflections of the transmitted light. Since reflections of the transmitted light are not received at the portion of the sensor 132, codewords do not exist and are not identified in the portion of the captured image from the portion of the sensor 132.

As shown, the depth map 504 includes more holes than the depth map 506. For example, the entirety of the portion 508A of the depth map 504 includes invalid data while the majority of the corresponding portion 508B of the depth map 506 includes valid data. However, the depth map 504 is at a higher resolution than the depth map 506. For example, the portion 510A of the depth map 504 includes more detail than the corresponding portion 510B of the depth map 506.

Some structured light systems require a tradeoff between the resolution of the depth map and the amount of invalid data in the depth map when selecting the codeword size to be used in analyzing the captured image. The intensity of the transmitted light may be increased to attempt to overcome interference and reduce the amount of invalid data in the depth map. However, regulations, safety concerns, and power constraints may require the intensity of the transmitted light to be limited, and the permitted increase in intensity may not be sufficient without increasing the codeword size (thus lowering resolution).

To overcome the limitations of such structured light systems, aspects of the present disclosure include a structured light system where different scale codewords are used for analyzing one captured image. In some aspects, the transmitter and receiver may be a conventional transmitter and a conventional receiver for a structured light system, and the captured image from the receiver is processed using different scale codewords. The processing may be non-recursive for the same codeword (i.e., the same codeword is not used multiple times for a portion of the captured image being analyzed). In this manner, a portion of the captured image is analyzed once for each scale (and the process is not repeated at a different time for the same scale). Such processing may allow a depth map to be generated in near real-time of capturing the image. Additionally, processing the captured image using different scale codewords increases the probability of determining finer scale codewords existing in the captured image and reducing the portions of a depth map that conventionally would include invalid data by using a finer scale codeword (such as the portion 508A).

In some example implementations, the device 200 may analyze the captured image (including the reflected codeword distribution) using a larger codeword size (such as at scale 3), then the device 200 may analyze the captured image (including the reflected codeword distribution) using a smaller codeword size (such as at scale 0-2). For example, the device 200 may analyze, for each bit of the captured image, a corresponding portion of the captured image using codewords of scale 3, then of scale 2, then of scale 1, and finally of scale 0. In this manner, the device 200 may attempt to increase the resolution of the depth map by more accurately determining a codeword for each bit of the captured image. In some example implementations, the device 200 may determine a scale 0 codeword for each bit of the captured image. In some other example implementations, the device 200 may determine a codeword that may be of any suitable scale for each bit of the captured image.

Figure 6:
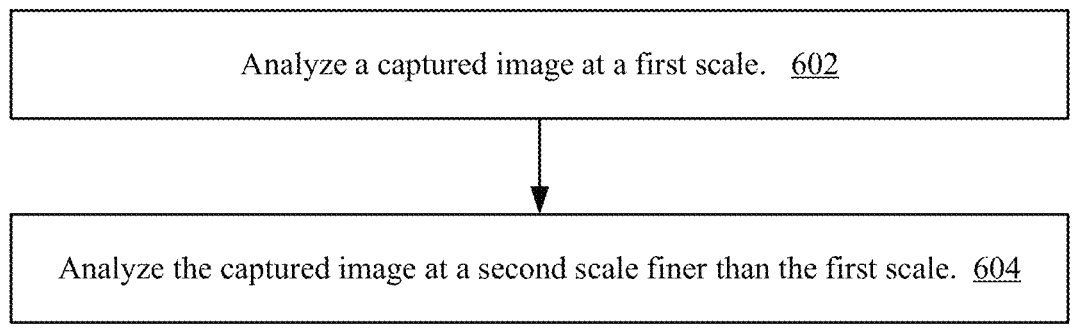
FIG. 6 is an illustrative flow chart depicting an example operation for analyzing a captured image at different scales.

FIG. 6 is an illustrative flow chart depicting an example operation 600 for analyzing a captured image at different scales. The following examples are described in reference to the device 200. However, other devices or systems may be used, and the present disclosure should not be limited by the examples. Additionally, for the following examples, a scale 0 codeword is size 4×4 (as shown in FIG. 3), a scale 1 codeword is size 5×5 (as shown in FIG. 3), etc., but the scale may refer to any size codeword, and the present disclosure should not be limited to the following examples or specific size codewords corresponding to a scale number.

Beginning at 602, the device 200 (such as the signal processor 212 or the processor 204) may analyze a captured image from the receiver 202 at a first scale. The captured image may include reflections of the codeword distribution of transmitted light. In some examples of analyzing the captured image at the first scale, the device 200 may compare portions of the captured image to the first scale codewords in the codeword distribution. At 604, the device 200 may then analyze the captured image at a second scale finer than the first scale. In some examples of analyzing the captured image at the second scale, the device 200 may compare smaller portions of the captured image to the second scale codewords in the codeword distribution.

For example, if the first scale is scale 3, the device 200 may determine 7×7 bit patches of the captured image. The patches may overlap, and a unique 7×7 patch may correspond to each bit of the captured image. The device 200 then may compare the scale 3 codewords to each 7×7 patch and may determine the likelihood for each scale 3 codeword existing in the patch. For analyzing the captured image at scale 2, the device 200 may determine 6×6 bit patches of the captured image. The patches may overlap, and a unique 6×6 patch may correspond to each bit of the captured image. The device 200 then may compare the scale 2 codewords to each 6×6 patch and may determine the likelihood for each scale 2 codeword existing in the patch.

In some example implementations, the device 200 may analyze the captured image at progressively decreasing scales. For example, the scale 3 codewords may be compared to each 7×7 patch of the captured image, and a likelihood for each scale 3 codeword existing in the patch may be determined. Then, the scale 2 codewords may be compared to each 6×6 patch of the captured image, and a likelihood for each scale 2 codeword existing in the patch may be determined. Then, the scale 1 codewords may be compared to each 5×5 patch of the captured image, and a likelihood for each scale 1 codeword existing in the patch may be determined. Finally, the scale 0 codewords may be compared to each 4×4 patch of the captured image, and a likelihood for each scale 0 codeword existing in the patch may be determined.

In some example implementations, determining the likelihoods for finer scale codewords may depend on the determined likelihoods for coarser scale codewords. For example, the likelihood of a scale 0 codeword existing in a 4×4 patch of the captured image may depend on one or more determined likelihoods for scale 1 codewords existing in 5×5 patches of the captured image. The likelihood may be called a confidence, and the dependency between confidences is described in more detail further below.

The examples describe analyzing, at a scale, each patch of the captured image. For example, all scale 0 codewords may be compared to each and every 4×4 patch in the captured image (with the number of 4×4 patches equaling the number of bits in the captured image). While the following examples describe analyzing each patch, the analysis alternatively may be performed for only a subset of patches. For example, portions of the captured image may not include sufficient capture values to determine whether codewords exist (such as the portion of a captured image from a portion of the receiver sensor blocked by the edge of the receiver aperture, thus not receiving reflections of the transmitted light). In another example, the device 200 may determine that the capture values of a patch of the captured image are too small (such as less than an intensity threshold). In another example, the device 200 may skip patches or otherwise compare codewords to only a subset of the patches of the captured image. The present disclosure should not be limited to analyzing each patch or portion of the captured image.

Figure 7A:
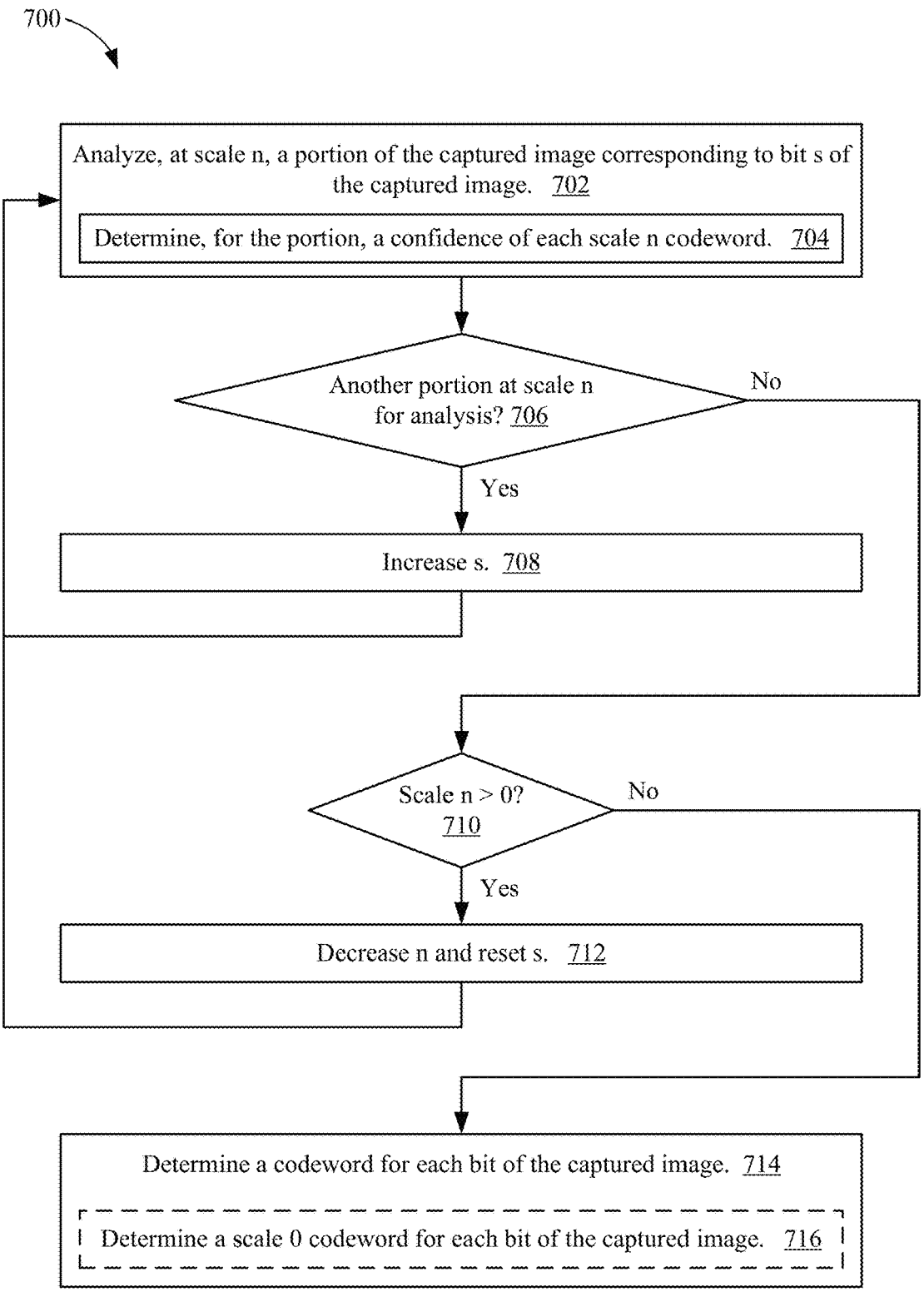
FIG. 7A is an illustrative flow chart depicting an example operation for analyzing a captured image at progressively decreasing scales.

FIG. 7A is an illustrative flow chart depicting an example operation 700 for analyzing a captured image at progressively decreasing scales. Beginning at 702, the device 200 may analyze, at a scale n, a portion of the captured image corresponding to a bit s of the captured image. In some example implementations, a scale n may be set to a coarsest scale N, and a first portion corresponding to a first bit of the captured image may be analyzed. The first bit may be the top-left bit of the captured image. s may equal 1 for the first bit. The portion of the captured image corresponding to the top-left bit may be a patch of the captured image including the first bit as the top-left bit of the patch. The size of the patch may correspond to the scale n. For example, if N=3 and scale n=scale N, the patch may be a 7×7 bit patch of the captured image.

If the coarsest scale N is 3, the device 200 may include codewords in the library of codewords 209 of a maximum size of 7×7 bits. Analyzing the portion corresponding to the bit s of the captured image may include the device 200 determining the 7×7 bit patch of the captured image corresponding to the bit s. During analysis of the 7×7 bit patch, the device 200 may compare the scale 3 (7×7 bits in size) codewords of the codeword distribution to the captured values in the 7×7 bit patch. For example, the device 200 may compare each scale 3 codeword in the library of codewords 209 to the patch of the captured image. Based on the comparison during the analysis, the device 200 may determine a confidence for each scale n (such as scale 3 in the current example) codeword (704). The confidence may be a probability or other indication of the likelihood that the patch of the captured image includes the compared codeword. For the coarsest scale n=N, the confidences may be determined using a maximum likelihood estimation. A smaller confidence may indicate a lower likelihood that a codeword exists in the patch than another codeword. In some example implementations, confidences determined for codewords at a larger scale (such as scale n+1) may impact the confidences determined at the smaller scale (such as scale n). In one example, determining the confidences may be limited to being affected by the immediately larger scale confidences (such as the confidences for scale n codewords affecting the confidences for scale n−1 codewords). Example determinations of confidences are described in more detail further below.

In some example implementations, the device 200 may determine or create a confidence map of the codewords for the bit s and the scale n. For example, the confidence map includes a confidence for each scale n codeword compared. Alternatively, other suitable structures or processes may be used for persisting the confidences determined for the scale n codewords for the patch corresponding to bit s of the captured image. In some example implementations, the confidences for scale n codewords may impact determining the confidences for scale n−1 codewords (when analyzing at scale n−1), as described in more detail further below. The confidence map may be one implementation for persisting the determined confidences at a scale n for use in determining confidences at a scale n−1.

After analyzing the portion of the captured image corresponding to bit s, the device 200 may determine if another portion of the captured image is to be analyzed (706). If another portion is to be analyzed, the device 200 may increase s (708). For example, if a patch corresponding to the first bit (s=1) of the captured image was analyzed, a patch corresponding to a second bit (s=2) of the captured image may be next to be analyzed. A second bit may be the neighboring bit to the right of the first bit, may be the neighboring bit below the first bit, or may be any other bit for a suitable order of the bits of the captured image. The portion of the captured image may be the patch including the second bit as the top-left bit of the patch.

The example operation 700 may then revert to step 702, and the device 200 may analyze, at scale n, the next portion of the captured image. In some example implementations, the device 200 may proceed through the analysis of the portions of the captured image for all bits of the captured image. The order of the bits may be from left to right for the top row of bits, from left to right for the next row of bits, and so on. Alternatively, the order of the bits may be any suitable bit order.

The portions of the captured image may overlap. For example, if (i) the first bit (s=1) is the top-left bit, (ii) the second bit (s=2) is the neighboring bit to the right of the first bit, and (iii) the portions are 7×7 bit patches of the captured image with the corresponding bit as the top-left bit of the patch, all 7 rows and 6 of the 7 columns of bits overlap for the two patches (7×6 bits overlap). As a result, a scale 2 codeword may exist in the overlap of the patches, while a scale 3 codeword may exist in each of the patches. The device 200 may adjust the confidence for such scale 2 codeword for a 6×6 patch in the overlap based on the confidences of the scale 3 codeword for the two patches. Example determinations of confidences are described in more detail further below.

Referring back to 706, if all portions of the captured image are analyzed (bit s equals the maximum number of bits for the captured image), the example operation may proceed to 710. If the scale n is greater than 0 (710), n may be decreased (such as by 1) and s may be reset to 1 (712), and the example operation 700 may revert to step 702. In this manner, the device 200 may analyze smaller portions of the captured image at a finer scale (712). For example, after analyzing 7×7 patches of the captured image (using scale 3 codewords), the device 200 may analyze 6×6 patches of the captured image (using scale 2 codewords). In this manner, the device 200 may determine confidences for the decreased scale n codewords for each smaller portion of the captured image. The confidences of the codewords for a portion may be impacted by the confidences of the larger scale codewords for the larger portions including the portion (such as the larger patches including the smaller patch). Determining the confidences is described in greater detail further below.

Referring back to 710, if scale n is not greater than 0, the example operation proceeds to 714. In this manner, steps 702-712 of the example operation 700 may be performed until confidences are determined for each size portion of the captured image at each scale. For example, if n is from 0 to 3, the device 200 may determine confidences of the scale 3 codewords for each 7×7 patch of the captured image, may determine confidences of the scale 2 codewords for each 6×6 patch of the captured image, may determine confidences of the scale 1 codewords for each 5×5 patch of the captured image, and may determine confidences of the scale 0 codewords for each 4×4 patch of the captured image.

In step 714, the device 200 may determine or set a codeword for each bit of the captured image. In some example implementations, the device 200 may determine or set a scale 0 codeword for each bit (716). For example, the device 200 may select the scale 0 codeword with the highest confidence for the 4×4 patch corresponding to the bit in the captured image.

In some other example implementations, the device 200 may determine for a bit a codeword that may be of any scale. For example, the device 200 may compare the confidences of the different scale codewords determined for the different size patches corresponding to the bit. The device 200 may then determine the codeword with the highest confidence. In some example implementations, the comparison may be a weighted comparison to skew the determination towards lower scale codewords. For example, if a confidence of a scale 0 codeword equals the confidence of a scale 1 codeword for the bit, the weighted comparison may cause the device 200 to select the scale 0 codeword for the bit.

With a codeword determined for each bit of the captured image, the device 200 may determine depths of objects in the scene (such as generating a depth map from the captured image).

In the example operation 700 in FIG. 7A, the device 200 may analyze the portions of the captured image for each bit and at each scale. The device 200 may then determine a codeword for each bit based on the analysis. In some alternative implementations, the device 200 may attempt to save time and processing resources by stopping processing at finer scales for one or more bits if the confidences of the codewords for the corresponding portions of the captured image are too low. For example, the confidences may be too low if the confidence of each scale n codeword for a patch is less than a confidence threshold. In this manner, the device 200 may stop analyzing a portion of the captured image at the current scale (such as scale n), and the device 200 may determine a coarser scale codeword (such as a scale n+1 codeword) for the corresponding bit of the captured image.

Figure 7B:
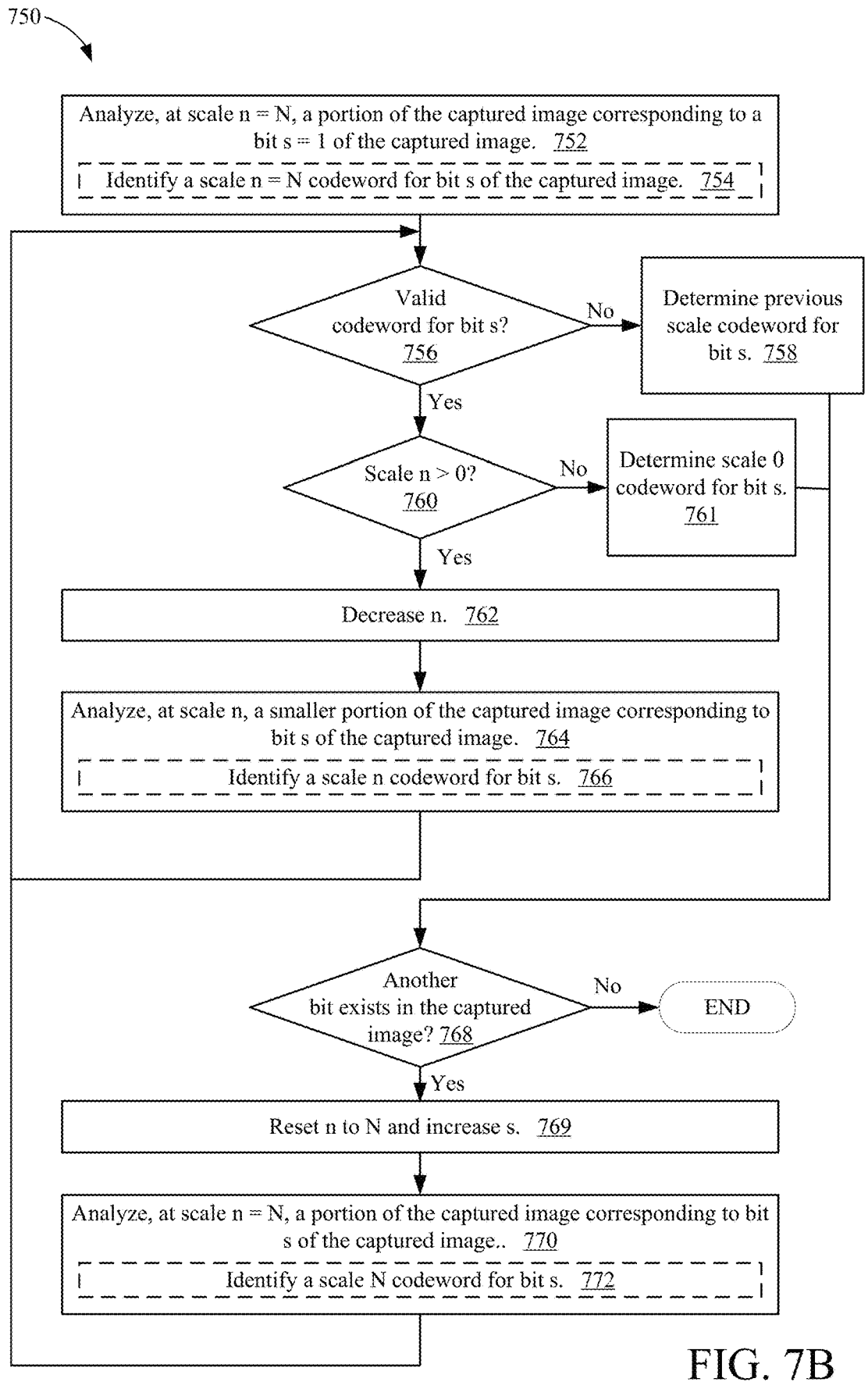
FIG. 7B is an illustrative flow chart depicting another example operation for analyzing the captured image at progressively decreasing scales.

FIG. 7B is an illustrative flow chart of another example operation 750 for analyzing a captured image at progressively decreasing scales. The order of the bits of the captured image may be the same as for the example operation 700 in FIG. 7A. Further, the size of the portions of the captured image, and the relationship between a portion of the captured image and a bit of the captured image, may be the same as for the example operation 700 in FIG. 7A.

Beginning at 752, the device 200 may analyze a portion of the captured image corresponding to a bit s=1 of the captured image at a scale n=N (with N indicating the coarsest scale of codewords for the codeword distribution). The operation of step 752 may be similar to step 702 in FIG. 7A. For example, bit s=1 may be the first bit of the captured image, and the first bit may be the top-left bit of the captured image. If N=3, the device 200 includes codewords in the library of codewords 209 of a maximum size of 7×7 bits. In analyzing the portion corresponding to the bit s, the device 200 may determine a 7×7 bit patch of the captured image corresponding to the bit s (such as the bit being the top-left bit of the 7×7 bit patch). For the 7×7 bit patch, the device 200 may compare the scale 3 codewords of the codeword distribution to the capture values in the 7×7 bit patch. In one example, the device 200 may determine a confidence in each scale 3 codeword based on the comparison. The confidence may be a probability or other measurement of the likelihood that the patch includes the codeword. Example confidences are described in more detail further below.

The device 200 optionally may identify a scale N codeword for bit s of the captured image (754). For example, the device 200 may identify the scale N codeword with the greatest confidence for the portion of the captured image corresponding to the bit. In some other examples, the device 200 may identify a codeword whose confidence is first measured to be greater than a confidence threshold. Alternatively, the device 200 may determine the confidences without identifying a specific scale n codeword for the bit (thus not performing step 754).

The device 200 may not identify a codeword for the bit with absolute certainty. For example, since there may be ambient light, noise, or other interference that may affect the capture values of the captured image, each determined confidence may be less than a maximum indicating that the probability of the codeword existing is certain. In other words, there may be some likelihood that the codeword is incorrectly identified. Irrespective if the device 200 is to identify a scale N (or n when n does not equal N) codeword, a confidence map may indicate the likelihood that each codeword exists in the patch. Similar to the example operation 700 in FIG. 7A, the confidences may be affected by the immediately larger scale confidences (such as the confidences of scale n−1 codewords being impacted by the confidences of scale n codewords). Examples of such impact are described further below in describing example confidences.

After analyzing a portion of the captured image at scale N (752, during which a scale N size codeword may be identified (754)), the device 200 may determine if a valid codeword exists for the analyzed portion corresponding to the bit (756). For example, the device 200 may determine if the identified scale n codeword for the first bit is valid. In some example implementations, the identified codeword may be determined to be valid if the confidence for the codeword is greater than the confidence threshold. For example, the identified codeword may be the codeword with the greatest confidence, but the identified codeword may not be valid if the confidence is still less than the confidence threshold. The confidence threshold may indicate a minimum confidence for which the likelihood the codeword exists in the patch is still sufficient (such as greater than a 50 percent likelihood or another level of likelihood that the codeword exists in the patch). The confidence threshold may be the same or different for different scales and/or portions of the captured image being analyzed. The confidence threshold may also be static or user adjustable, heuristically adjustable, determined by a manufacturer, etc. If the device 200 does not perform step 754 in identifying a codeword, the device 200 may determine if a valid codeword exists for the bit by comparing the determined confidences for the codewords to the confidence threshold. If one or more of the confidences are greater than the confidence threshold, the device 200 may determine that a valid codeword exists for the bit.

If a valid codeword does not exist (such as the confidence or confidences being less than the confidence threshold), and if a previous (coarser) scale size codeword for the bit is valid, a previous scale codeword is determined for bit s (758). For example, if n+1=N, and a scale N codeword was identified for bit s but the scale n codewords are not valid for the bit s, the device 200 may determine the identified scale N codeword for bit s. Alternatively, if the device 200 did not perform step 754, the device 200 may determine the codeword to be the scale N codeword with the highest confidence.

If scale n=N and the scale N codewords are considered invalid (such as the confidences being less than the confidence threshold), the device 200 does not determine a codeword for bit s. In this manner, a depth map may include a hole corresponding to the bit (such as black portions of depth maps 504 and 506 in FIG. 5). The example operation 750 then proceeds from step 758 to 768, where the device 200 determines if another portion of the captured image is to be analyzed (another bit exists in the captured image). Similar to the example operation 700 in FIG. 7A, the device 200 may analyze each portion of the captured image, with a unique portion of the captured image corresponding to each bit of the captured image.

Referring back to 756, if a valid codeword exists for bit s, the device 200 determines if scale n>0 (760). In other words, the device 200 may determine if a scale finer than n exists for the codeword distribution. If scale n>0, the device 200 may decrease n (762). For example, the device 200 may decrement n by 1. In some other example implementations, the device 200 may decrease n by different amounts, such as 2 or more. Alternative to decreasing n by 1, n may be decreased by more than 1 based on the confidences of the codewords. As an illustrative example, if a confidence of an identified scale 3 codeword is 90% and the threshold for determining if the codeword is valid is 60%, the device 200 may determine that the codeword has a high confidence and may use a greedy process to decrease the scale n by two or more (instead of one) to more quickly determine the finest scale codeword that is considered valid for the bit. Conversely, if the confidence for the currently identified codeword is close to the confidence threshold (such as 62% for a 60% threshold), the device 200 may determine to decrement scale n by one. Alternatively, if the confidence is within a range or close to the threshold, the device 200 may assume that finer scale codewords will not have a confidence greater than the confidence threshold for the bit, and the device 200 may determine to not decrease the scale and set a codeword at the current scale for the bit.

After decreasing n, the device 200 may analyze, at reduced scale n, a smaller portion of the captured image corresponding to bit s of the captured image (764). The operation for step 764 may be similar to step 752, except at a smaller scale n than N. In some example implementations, the device 200 analyzes a progressively smaller patch corresponding to the bit s at progressively finer scales until reaching the finest scale (scale 0). For example, the device 200 may compare from scale 3 to scale 0 codewords to patches from size 7×7 to size 4×4 of the captured image. In some example implementations, the device 200 may identify a scale n codeword for bit s (766). Step 766 may be similar to step 754, except at a reduced scale n<N. The example operation then reverts to 756.

Referring back to 760, if scale n=0 (n is not greater than 0), the device 200 may determine a scale 0 codeword for bit s (761). For example, if the device 200 identifies a scale 0 codeword (performs step 766 at scale n=0), the device 200 may determine the identified scale 0 codeword for bit s. In another example, if the device 200 does not perform step 766 at scale n=0, the device 200 may determine the scale 0 codeword with the highest confidence as the codeword for bit s. The example operation 700 may proceed from step 761 to 768, where the device 200 determines if another portion of the captured image is to be analyzed (another bit exists in the captured image).

After a codeword is determined for bit s (step 758 or 761), or after determining no codeword is for bit s (such as the confidences of the scale N codewords being less than the confidence threshold), the device 200 may determine whether another bit in the captured image exists (768). For example, if s<S, with S equaling the number of bits in the captured image, the device 200 may determine that another bit exists. In some example implementations, the device 200 may progress through the bits in a left to right, top row down manner until all corresponding portions of the captured image are analyzed. Similar to example operation 700 in FIG. 7A, though, the order of the bits in the captured image may be any suitable order. If another bit exists, the device 200 may reset n to N and increase s (769). For example, s may be incremented by 1. The device 200 may then analyze, at scale n=N, a portion of the captured image corresponding to bit s of the captured image (770). In some example implementations, the device 200 may identify a scale N codeword for bit s (772). The operations for step 770 and optional step 772 may be similar to the operations for step 752 and optional step 754, except the analysis and identification is performed for a different bit of the captured image.

Referring back to 768, if no further bits in the captured image exist (e.g., s=S), example operation 750 ends. In this manner, a codeword may be determined for each bit. The determined codewords may then be used to generate a depth map or determine depths of objects in the scene.

While the example operations describe analyzing portions of the captured image sequentially, portions of the captured image may be analyzed concurrently. For example, the device 200 may use multiple processors (such as signal processor 212 and/or processor 204), multiple processor cores, and/or multiple processing threads to concurrently determine confidences of the codewords for a plurality of captured image portions. The present disclosure should not be limited to a specific example of sequential processing or a specific ordering of the bits for processing portions of the captured images.

Determining Confidences of Codewords

Regarding determining confidences for codewords, if the codeword distribution is hardcoded on the transmitter 201 (in FIG. 2), and the library of codewords 209 includes all codewords (at the different scales) in the codeword distribution, the location of a codeword relative to another codeword in the codeword distribution may be mapped in the library of codewords 209. For example, the library of codewords 209 may be organized so that the device 200 may determine a location of a codeword relative to another codeword in the codeword distribution. Additionally, a scale n codeword includes a finite number of codewords at a scale less than n. For example, a scale n codeword includes four child scale n−1 codewords. Similarly, a scale n−1 codeword has four parent scale n codewords.

Referring back to FIG. 3, the 5×5 patch 308 may be a scale 1 codeword, and the 4×4 patch 306 may be a scale 0 codeword. As shown, the scale 0 codeword is included in the scale 1 codeword. Three other scale 0 codewords that exist in the scale 1 codeword include a scale 0 codeword at the 4×4 patch shifted one bit lower than the 4×4 patch 306, a scale 0 codeword at the 4×4 patch shifted one bit to the right of the 4×4 patch 306, and a scale 0 codeword at the 4×4 patch shifted one bit lower and one bit to the right of the 4×4 patch 306. Similarly, four scale 1 codewords may exist in the 6×6 patch 310 (which may be a scale 2 codeword), and four scale 2 codewords may exist in the 7×7 patch 312 (which may be a scale 3 codeword).

Figure 8:
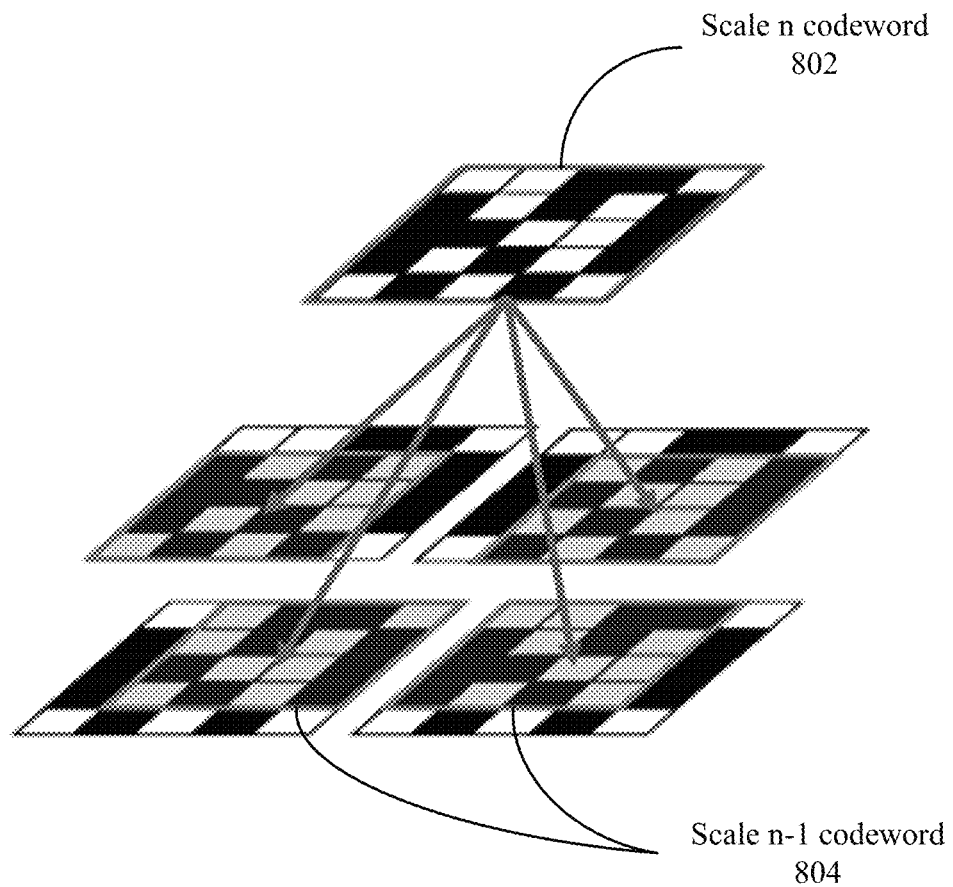
FIG. 8 is a depiction of four scale n−1 codewords in an example scale n codeword.

FIG. 8 is a depiction of an example scale n codeword 802 including four scale n−1 codewords 804. If each square of the scale n codeword 802 is a bit of the codeword distribution, then the scale n may be 1, corresponding to a 5×5 bit codeword. In this manner, n−1=0, and the scale n−1 codewords 804 are 4×4 bit codewords. If a scale n codeword is identified for a 5×5 bit portion of the captured image with absolute confidence (such as the probability or confidence of the codeword being 100%), the only possible scale n−1 codewords in a 4×4 bit portion in the 5×5 bit portion of the captured image are the four n−1 codewords in the scale n codeword (which are called "children codewords" to a "parent codeword"). Each child n−1 codeword includes four children n−2 codewords, and so on, until scale 0. For example, a scale 3 codeword includes 4 scale 2 children codewords, 16 scale 1 codewords (4 scale 2 children codewords×4 scale 1 codewords per scale 2 child codeword), and 64 scale 0 codewords (16 scale 1 codewords×4 scale 0 codewords per scale 1 codeword).

If the device 200 is able to determine, for a portion of the captured image, a scale n codeword with absolute certainty (such as the confidence equaling 100 percent), the device 200 may determine a finer scale codeword for smaller portions within the portion of the captured image by comparing only the children codewords of the determined scale n codeword to the smaller portion (excluding other codewords from comparison). However, the device 200 may not determine a codeword with absolute certainty (such as the confidence being less than 100 percent). In some example implementations, a determined confidence of a parent codeword may be used to impact determining the confidence for a child codeword. For example, the probability or confidence of each of the children scale n−1 codewords 804 may be impacted by the confidence of the scale n codeword 802.

For example, given that a scale 1 codeword is determined to have a confidence w for a 5×5 bit portion of the captured image, the device 200 may adjust or determine the confidence of scale 0 children codewords of the scale 1 codeword based on the confidence w. In this manner, the device 200 may prejudice the confidence determination toward children codewords of higher confidence parent codewords without completely removing other potential codewords from being part of the analysis. In some example implementations, the confidence determinations of codewords from coarser scales to finer scales may be treated as a Markov chain. As a result, only the potential parent codewords' confidences at scale n may impact the confidence of a scale n−1 codeword. In this manner, the device 200 may ignore the confidences for any codeword at scale n+1 or greater when determining a confidence for a scale n−1 codeword.

The following portions of the disclosure describe example implementations for determining the confidences of codewords (including coarser scale codeword confidences impacting finer scale codeword confidences). The examples are provided for illustrative purposes, and the present disclosure should not be limited to the following examples.

Figure 9:
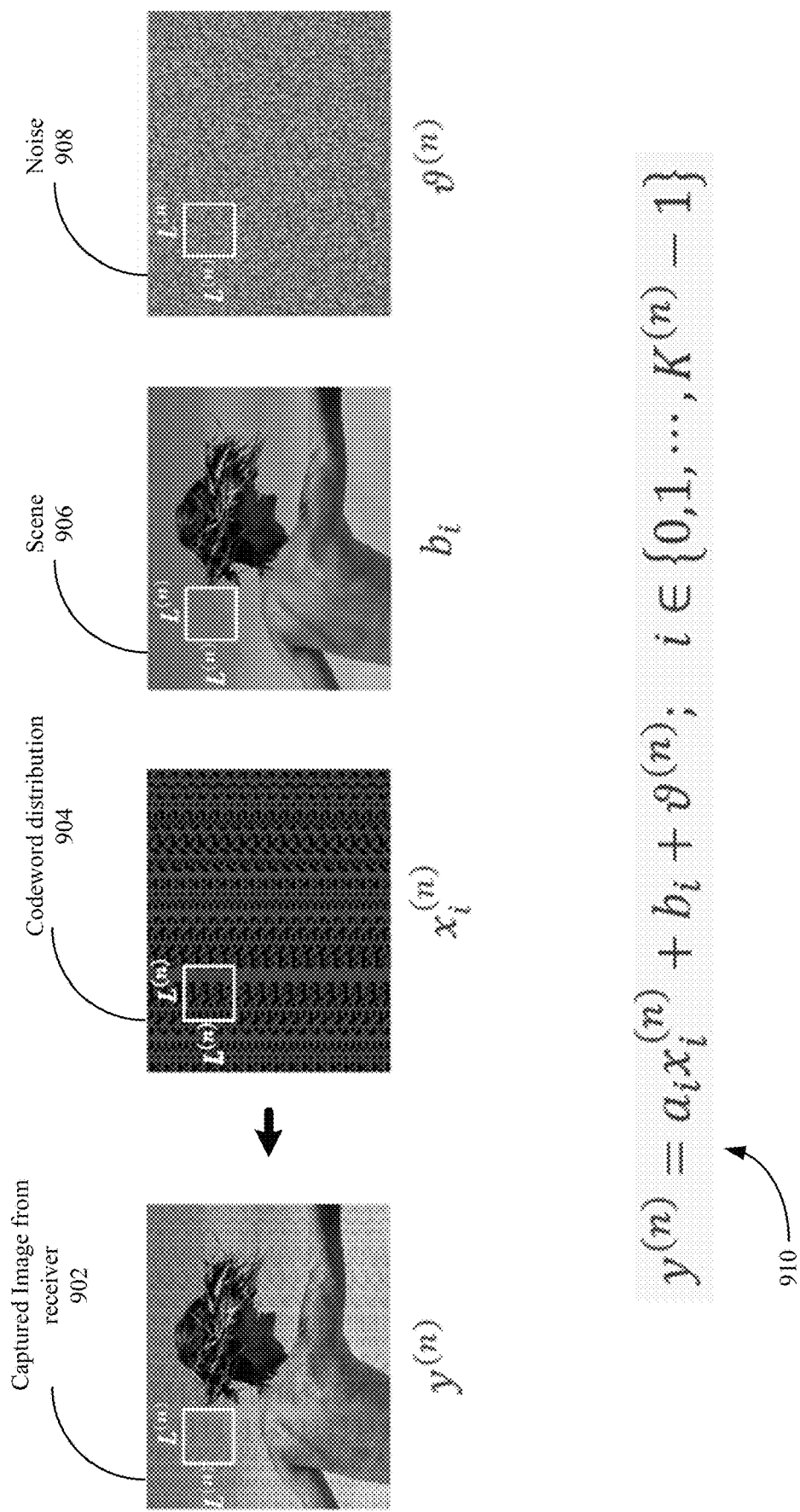
FIG. 9 is a depiction of an example captured image from a receiver, the image including the codeword distribution, ambient light from the scene, and noise or interference.

FIG. 9 is a depiction of an example image 902 as measured or sensed by a receiver (such as receiver 202 of FIG. 2), which may include the codeword distribution 904 (such as codeword distribution 104 of FIG. 1), ambient light from the scene 906, and noise or interference 908. In some example implementations, the captured image (or image) 902, represented as $y^{(n)}$, may be modeled by signal model 910 and below, indicated as equation (1):

$$y^{(n)} = a_i x_i^{(n)} + b_i + v^{(n)} \text{ for } i \in \{0, 1, \ldots K^{(n)} - 1\} \qquad (1)$$

where n is the scale, $a_i$ is an attenuation value less than 1, $K^{(n)}$ is the number of codewords existing in the codeword distribution for scale n, and i is a codeword within the number of codewords $K^{(n)}$. Equation (1) models the image 902 to be a sum of an attenuated codeword distribution $a_i x_i^{(n)}$ (with the intensity of the transmitted codeword distribution being diminished as a result of, e.g., diffusion and diffraction before being received at the receiver), reflected constant ambient light from the scene $b_i$ (which is assumed to be not changing and is independent of the scale being used to analyze image 902), and noise $v^{(n)}$. The noise may be gaussian or random. Alternatively, the noise may be dependent on the location in the image (e.g., noise may intensify when moving away from the center of the image 902) or other factors so that the noise may be modeled deterministically. $L^{(n)}$ (in FIG. 9) may be the length or width of patches of the image 902 corresponding to the scale n. If the device 200 analyzes a $L^{(n)} \times L^{(n)}$ patch (in FIG. 9) of the image 902, a scale n codeword i from the potential codewords $\{0, 1, \ldots K^{(n)}-1\}$ for i may increase or maximize $x_i^{(n)}$ and $b_i$, thereby decreasing or minimizing noise $v^{(n)}$.

In changing the notation of the signal model for later ease of explanation, the image (Y) captured by the receiver sensor is modeled as a linear combination of three components: a codeword image G formed by the reflected codeword distribution of light from the scene; an interference image B formed by the ambient light; and a noise image W. Assuming $y_s$, $g_s$, $b_s$, and $w_s$ denote pixel values in L×L patches of images Y, G, B, and W, respectively, with the top-left corner bits of the L×L patches at bit s, and further assuming the values in the local patches are arranged as L×L dimensional column vectors, $y_s$ may be denoted as in equation (2) below:

$$y_s = g_s + b_s + w_s \tag{2}$$

The L×L size reflected codeword $g_s$ for bit s is a channel-distorted version of an $$\frac{L}{P} \times \frac{L}{P}$$

transmitted binary sequence, represented by the label x, as given in equation (3) below:

$$x \in \chi \triangleq \{0, 1, \ldots M-1\} \tag{3}$$

where P×P is the spatial support of a dot or hole (invalid data) in the captured image and M is the total number of unique $$\frac{L}{P} \times \frac{L}{P}$$

binary codes (1s and 0s) that may be projected by the transmitter 201 for the L×L patch.

A distortion function for the light from transmitter to receiver may be difficult to model, as it depends on a number of factors including surface reflectance properties of objects in the scene, the point spread function (PSF) of the transmitter lens (such as the lens 126 in FIG. 1), and the PSF of the receiver lens (such as the lens 130 in FIG. 1). For ease of computing, the cumulative effect of the different distortions may be simplified to a spatially-dependent attenuation of the transmitted signal (in terms of the codeword distribution) and a spatially-invariant blurring operation (which may be considered static or fixed regardless of the scene content and camera capture conditions).

In this manner, denoting blurred L×L patch size codewords as elements corresponding to codewords x ∈ (all possible codewords $\chi$) may be as in equation (4) below:

$$f(x): \chi \to \mathbb{R} \tag{4}$$

and the reflected codeword $g_s$ in the image may be expressed as in equation (5) below:

$$g_s \triangleq a_s f(x_s) \tag{5}$$

where $x_s$ denotes the codeword for bit s and $a_s > 0$ denotes the codeword attenuation at bit s of the sensor. Since the blurring kernel f is considered fixed or static, the elements $f(x_s)$ may be computed prior to processing a captured image.

In some example implementations, for ease of computing, the received codeword distribution is de-meaned for each codeword k and the standard deviation is adjusted to a normal distribution standard deviation, as depicted in equation (6) below:

$$\sum_i f_i(k) = 0 \text{ and } \frac{1}{L^2} \sum_i f_i^2(k) = 1 \; \forall k \in \chi \tag{6}$$

For structured light decoding, the high frequency portion of energy in the observed patch $y_s$ is primarily due to noise or the points of the codeword distribution (and not due to the scene). As a result, the interference image may be treated locally as a constant for ease of computing, thus contributing only a dc or constant offset (denoted by the positive scalar $b_s$) to the local patch, and the $L^2$ dimensional vector $b_s$ for the scalar $b_s$ may be simplified as depicted in equation (7) below:

$$b_s \triangleq b_s 1_{L^2} \tag{7}$$

where $1_{L^2}$ represents an $L^2$ dimensional column vector with all 1s.

As a result, the signal model for $y_s$ may be as depicted in equation (8) below (which is similar to equation (1), but in a different notation):

$$y_s = a_s f(x_s) + b_s 1_{L^2} + w_s \tag{8}$$

Knowing from the captured image the patches $y_s$ for s ∈ S, where S denotes the set of all bits in the captured image, the codewords $x_s$ are estimated. In knowing the codewords $x_s$, disparity values $d_s$ may be estimated through a predefined deterministic transformation h (which may be known based on the baseline and other characteristics of the structured light system), such that $d_s = h(s, x_s)$, indicating the distortion or displacement of the codewords in the reflections.

As previously stated, the confidence of a codeword at a first scale may be impacted by the confidences of coarser scale codewords. However, for the coarsest scale, no larger scale codewords exist. In this manner, the device 200 may determine confidences for the coarsest scale codewords without impact from confidences of other scale codewords. In some example implementations, the device 200 may use a maximum likelihood (ML) estimation or log-likelihood estimation to determine confidences for codewords without relying on confidences from other scale codewords (such as when determining confidences for the coarsest scale codewords). For example, ML estimation may be used by the device 200 for steps 702 and 720 in the example operation 700 in FIG. 7A, and for steps 752 and 770 in the example operation 750 in FIG. 7B. An example of ML estimation is described below.

The noise or interference 908 in FIG. 9 may be deterministic (such as related to characteristics of the scene 906, the structured light system, etc.), random, or a combination of both. While the noise 908 may be modeled with precision in some example implementations, in some other example implementations and for ease of computing, the noise may be considered Gaussian or random. For example, assuming that $w_s \in \mathbb{R}^{L^2}$ in equation (8) is additive white Gaussian noise with a probability distribution $N(0, \sigma^2 I_{L^2})$, where $I_{L^2}$ is an $L^2 \times L^2$ identity matrix. The conditional distribution of $y_s$ given $x_s$, $a_s$, and $b_s$, may then be as depicted in equation (9), below:

$$p(y_s \mid x_s, a_s, b_s) = \frac{1}{(2\pi\sigma^2)^{L^2/2}} \exp\left\{-\frac{1}{2\sigma^2} \|y_s - a_s f(x_s) - b_s 1_{L^2}\|_2^2\right\} \quad (9)$$

Further assuming that $y_s$ for each bit s is conditionally independent of the neighboring bits given $x_s$, $a_s$, and $b_s$, the negative log-likelihood function of the conditional distribution may be a sum of independent terms that may be calculated, as depicted in equations (10) and (11) below:

$$-\log p(y \mid x, a, b) = \sum_{s \in S} l(y_s \mid x_s) \quad (10)$$

$$-\log p(y \mid x, a, b) = \sum_{s \in S} \frac{1}{2\sigma^2} \|y_s - a_s f(x_s) - b_s 1_{L^2}\|_2^2 + \frac{L^2}{2} \log(2\pi\sigma^2) \quad (11)$$

The device 200 may compute the ML estimates of $x_s$, $a_s$, and $b_s$ by minimizing the negative log-likelihood function depicted in equation (10), such as depicted in equations (12)-(14), respectively, below:

$$\hat{x}_s = \underset{k \in \chi}{\mathrm{argmax}}(y_s^T f(k)) \quad (12)$$

$$\hat{a}_s = \frac{1}{L^2} y_s^T f(\hat{x}_s) \quad (13)$$

$$\hat{b}_s = \frac{1}{L^2} y_s^T 1_{L^2} \quad (14)$$

The ML estimate of the codeword $x_s$ (shown in equation (12)) is the codeword $k \in \chi$ for which the reflected codeword f(k) from the library of codewords 209 is maximally correlated with $y_s$. The per-bit computation involved in determining the estimate is the multiplication of an $M \times L^2$ dimensional matrix F, defined as $[f(0); \ldots ; f(M-1)]^T$, with an $L^2$-dimensional vector $y_s$. In some example implementations, the computations may be performed by signal processor 212 or processor 204 (which may be one or more processing units or multi-thread CPUs) for real-time applications.

In some example implementations, the device 200 may perform outlier rejection in determining a confidence for a codeword $\hat{x}_s$ computed using ML estimation. In some example implementations, the confidence is the posterior probability that $X_s = \hat{x}_s$ given $y_s$, the codeword reflectance/attenuation estimate $\hat{a}_s$, and the interference estimate $\hat{b}_s$, which may be computed as depicted in equation (15) below:

$$p(\hat{x}_s \mid y_s, \hat{a}_s, \hat{b}_s) = \frac{p(y_s \mid \hat{x}_s, \hat{a}_s, \hat{b}_s)}{\sum_{k \in \chi} p(y_s \mid k, \hat{a}_s, \hat{b}_s)} \quad (15)$$

assuming (i) all codewords are equally likely to occur in the coded image and (ii) any channel distortion and background signal are independent of the transmitted codeword distribution.

In some example implementations (such as for 756 in FIG. 7B), the maximum codeword estimate $\hat{x}_s$ may not be considered a valid codeword for bit s if the confidence is below a confidence threshold T, such as depicted in equation (16) below:

$$p(\hat{x}_s \mid y_s, \hat{a}_s, \hat{b}_s) < T \quad (16)$$

In some example implementations, confidences also may be determined using ML estimation for finer scales. However, one drawback of ML estimation for finer scales is that the estimation disregards spatial interaction or dependency between neighboring bits. As a result, a small adjustment or change to $y_s$, either due to noise or background, may affect the confidence or codeword determination, such that disparate/not neighboring scale 0 (or other scale) codewords may be determined for neighboring bits being analyzed, and the confidence of such codewords may be lower than a confidence threshold such that more portions of a depth-map include invalid data.

In some example implementations alternative to ML estimation, the device 200 may use maximum a posteriori (MAP) estimation at finer scales for determining confidences. MAP estimation takes into account local dependencies between neighboring pixels and therefore may provide more accurate confidences than by using ML estimation. However, some drawbacks of MAP estimation are that the calculations are computationally intensive, resource intensive, and time intensive, as codewords may be compared many times and portions of the captured image may be processed repeatedly using the same codewords at the same scale during analysis. Additionally, errors in mislabeling (such as incorrectly determining a codeword) or determining confidences are given the same weight at different scales even though erroneous labeling or confidence determination at a coarser scale is worse than erroneous labeling or confidence determination at a finer scale (since more bits of the captured image may be impacted by the error at the coarser scale).

In some other example implementations, a modified sequential MAP (SMAP) estimation may be used at finer scales (such as scales less than the coarsest scale), reducing the computation and resource requirements and decreasing the amount of time needed to calculate confidences. Additionally, the SMAP estimation, as described below, may penalize incorrect confidences of codewords more at a coarser scale than at a finer scale. In this manner, a multi-scale random field (MSRF) may be generated and a multi-scale matched filter for determining confidences of codewords at different scales may be used.

In defining a multiscale signal model, $y_s^{(n)}$ denotes bit values in an $L^{(n)} \times L^{(n)}$ patch at scale n and bit s (with, in some example implementations, bit s located at the top-left bit of the patch). Further, n=0 denotes the finest scale, and n=N denotes the coarsest scale, such that the window and codeword sizes for the scales are ordered as $L^0 < L^1 < \ldots L^N$ $x_s^{(n)}$ denotes the codeword for bit s and scale n, within the set of possible codewords for scale n, $\chi^{(n)}$, defined as the codewords $\{0, 1, \ldots M^{(n)}-1\}$, where $M^{(n)}$ is the number of codewords at scale n. Further, the de-meaned and standard deviation normalized codeword distribution corresponding to $\chi^{(n)}$ is depicted in equation (17) below:

$$f^{(n)}(x): \chi^{(n)} \to \mathbb{R}^{L^{(n)2}} \tag{17}$$

Additionally, $a_s$, $b_s$, and $w_s$ denote the codeword attenuation, signal component due to ambient light, and an $L^{(n)2}$ noise vector, respectively, for the patch corresponding to bit s. Therefore, $y_s^{(n)}$ may be modeled as depicted in equation (18) below and similar to equation (8):

$$y_s^{(n)} = a_s f^{(n)}(x_s^{(n)}) + b_s 1_{L^{(n)2}} + w_s^{(n)} \tag{18}$$

In some example implementations, a MSRF $\chi^{(n)}$ that has a Markov chain structure in scale may be used to determine confidences for the codewords. As a result, the distribution in $\chi^{(n)}$ is dependent only on the distribution in $\chi^{(n+1)}$, and not $\chi^{(n+q)}$ where an integer q is greater than 1 (i.e., analysis in the current scale is only dependent on analysis in the directly coarser scale and no other coarser scales). $Y^{(n)}$ may thus depend exclusively from the codewords $X^{(n)}$ for all bits s and scales n as indicated in equation (18). With $a=\{a_s\}$ and $b=\{b_s\}$ for all bits s, a and b are to be determined in order to determine $x_s^{(n)}$ from the distribution and known $y_s^{(n)}$. In some example implementations, a and b are considered unknown but deterministic (not random).

With Y and X representing $y_s^{(n)}$ and $x_s^{(n)}$ for all bits s and scales n, and further that all $y_s^{(n)}$ are conditionally independent given X and the other model parameters a and b, the conditional distribution of Y may be as depicted in equations (19) and (20) below:

$$p(y|x, a, b) = \Pi_{n=0}^{N} p(y^{(n)}|x^{(n)}, a, b) \tag{19}$$

$$p(y|x, a, b) = \Pi_{s \in S} \Pi_{n=0}^{N} p(y_s^{(n)}|x_s^{(n)}, a_s, b_s) \tag{20}$$

where $p(y_s^{(n)}|x_s^{(n)}, a_s, b_s)$ is a multivariate Gaussian distribution defined by an expression similar to equation (9) above described regarding ML estimation.

With $X^{(n)}$ being dependent only on $X^{(n-1)}$, spatial dependencies between codewords may be accounted for without requiring a significant increase in computation or processing resources. Relying on the Markov chain structure properties in scale, the confidences (as a probability mass function) for the codewords may be defined as depicted in equations (21)-(24) below:

$$p(x) \triangleq P(X^{(n)} = x^{(n)} \; n \geq 0) \tag{21}$$

$$p(x) = \Pi_{n=0}^{N} P(X^{(n)} = x^{(n)} | X^{(l)} = x^{(l)} \; l > n) \tag{22}$$

$$p(x) = \Pi_{n=0}^{N} P(X^{(n)} = x^{(n)} | X^{(n+1)} = x^{(n+1)}) \tag{23}$$

$$p(x) = \Pi_{n=0}^{N} P(x^{(n)}|x^{(n+1)}) \tag{24}$$

where $p(x^{(N)}|x^{(N+1)}) = p(x^{(N)})$. In some example implementations, the spatial dependencies between codewords may be local, where the analysis of a patch corresponding to the bit at scale n may be dependent only on patches for a neighborhood of bits around the bit ($\delta s$) at the coarser scale n+1. As a result, the confidence or probability distribution of X may be as depicted in equation (25) below, which is the product across scales and across all bits of the probability of $x_s^{(n)}$ given the probabilities of $x^{(n)}$ for the neighbors of bit s:

$$p(x) = \Pi_{s \in S} \Pi_{n=0}^{N} p(x_s^{(n)}|x_{\delta s}^{(n+1)}) \tag{25}$$

In some example implementations and for ease of computing, the neighbors of a bit s may be three other bits within a 2×2 patch including bit s, which may be the same at any scale n. In some other example implementations, the neighborhood for bit s may be defined as any size, and may vary depending on s and n.

Combining equations (19) and (25) yields a joint distribution of Y and X, as depicted in equation (26) below:

$$p(y, x|a, b) = \Pi_{s \in S} \Pi_{n=0}^{N} p(y_s^{(n)} \uparrow x_s^{(n)}, a_s, b_s) \\ p(x_s^{(n)}|s_{\delta s}^{(n+1)}) \tag{26}$$

Using the joint distribution of Y and X, the device 200 may estimate the disparity of codewords between scales (such as the distance between a scale n codeword and a scale n−1 codeword in the codeword distribution). In some example implementations, MAP estimation or a SMAP estimation may be used. As previously stated, the SMAP estimation may penalize incorrect confidence calculations at a coarser scale more than at a finer scale. In using cost functions for determining confidences for codewords, the SMAP estimation may use increasing cost factors at coarser scales to increasingly penalize incorrect confidence calculations. An example cost function under the SMAP estimation is as depicted in equation (27) below:

$$C_{SMAP}(X, x) = \Sigma_{n=0}^{N} \alpha^n C_n(X, x) \tag{27}$$

where $\alpha > 1$ and the cost function at scale n is as depicted in equation (28) below:

$$C_n(X, x) = 1 - \Pi_{i=n}^{N} \delta(X^{(i)} - x^{(i)}) \tag{28}$$

If N is the coarsest scale at which a confidence is determined, then the cost function is as depicted in equation (29) below.

$$C_{SMAP}(X, x) = \Sigma_{n=0}^{N} \alpha^n \tag{29}$$

With the cost function for SMAP estimation defined, the confidence of a codeword may be inversely related to the cost function. The device 200 may determine the confidence of a codeword to be the minimized cost function, as depicted in equation (30) below:

$$\hat{x} = \arg\min_x (E[C_{SMAP}(X, x)|y, a, b]) \tag{30}$$

In performing the minimization as depicted in equation (30), the coarse-to-fine calculations for computing the SMAP estimate in determining confidences of codewords at each bit s and scale n is as depicted in equation (31) below:

$$\hat{x}_s^{(n)} = \arg\min_{k^{(n)} \in \chi^{(n)}} \{\log p(y_s^{(n)}|k^{(n)}, a_s, b_s) + \log(k^{(n)}|\hat{x}_{\delta s}^{(n+1)})\} \tag{31}$$

In equation (31), a confidence of a scale n codeword for bits is based on the confidences of the parent scale n+1 codewords of the scale n codeword (as depicted by the term $\log (k^{(n)}|\hat{x}_{\delta s}^{(n+1)})$).

Using the signal model depicted in equation (18), the log of the conditional probability of $y_s^{(n)}$ given $k^{(n)}$ (where $k^{(n)} \in \chi^{(n)}$ denotes a codeword at scale n), given $a_s$, and given $b_s$ may be defined as in equations (32) and (33) below:

$$-\log p(y_s^{(n)}|k^{(n)}, a_s, b_s) \triangleq l_s^{(n)}(y_s^{(n)}|k^{(n)}, a_s, b_s) \tag{32}$$

$$-\log p(y_s^{(n)}|k^{(n)}, a_s, b_s) = \\ \frac{1}{2\sigma^2}\|y_s^{(n)} - a_s f^{(n)}(k^{(n)}) - b_s 1_{L^{(n)2}}\|_2^2 + \frac{L^{(n)2}}{2}\log(2\pi\sigma^2) \tag{33}$$

The first term in equation (33) is similar to the term in equation (11) regarding ML estimation.

In order to perform the estimation as depicted by equation (31), the device 200 may determine the conditional probability that $x_s^{(n)}=k^{(n)}$ (where $k^{(n)} \in \chi^{(n)}$) given estimates for the coarser scale codewords for neighbor bits of bit s, $\hat{X}_{\delta s}^{(n+1)} \in \sigma^{(n+1)}$.

Figure 10:
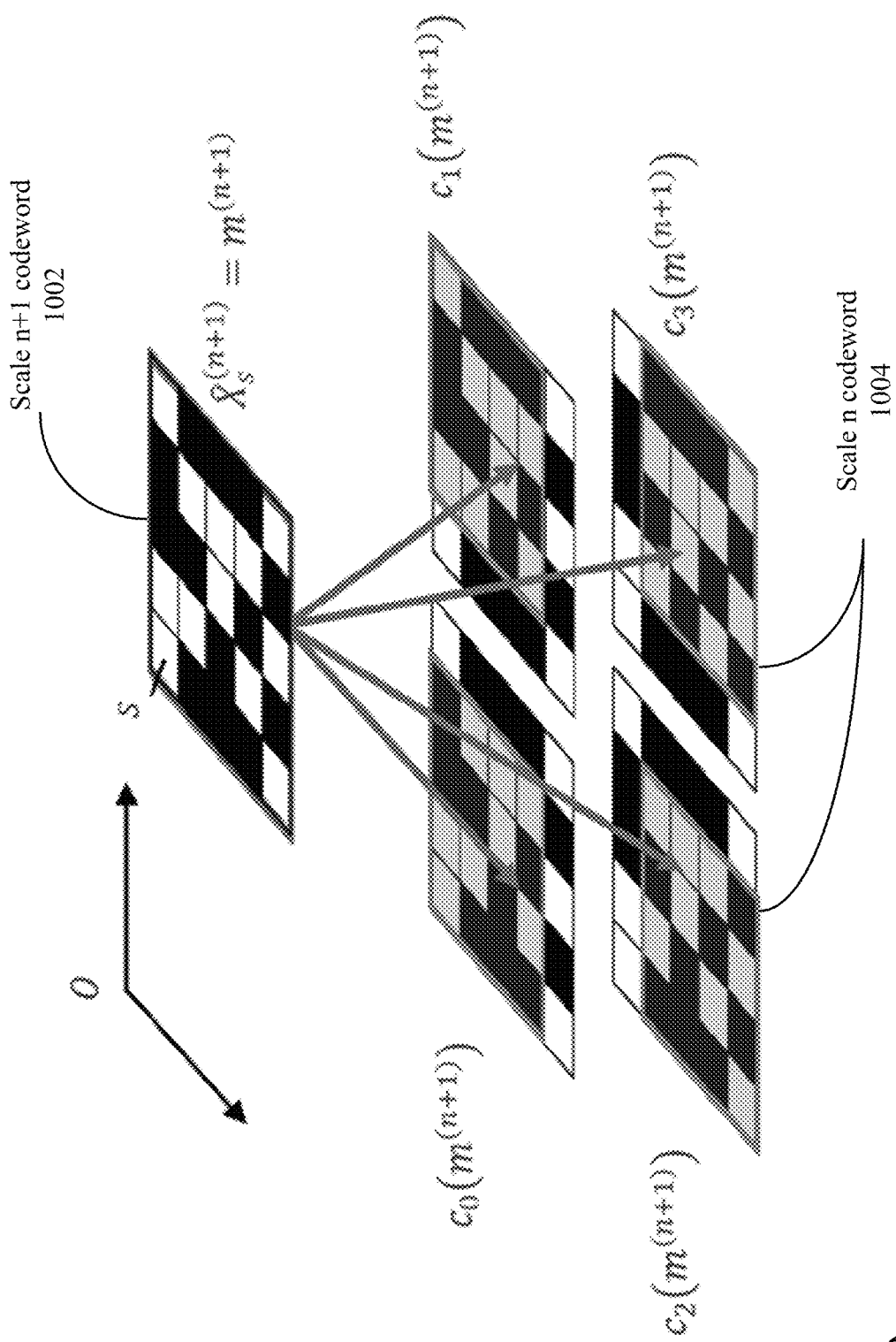
FIG. 10 is a depiction of four scale n children codewords of a scale n+1 parent codeword.

FIG. 10 is a depiction of four scale n children codewords 1004 of an example identified parent scale n+1 codeword 1002. The top-left bit of codeword 1002 is bit s. The children codewords 1004 are located at (have their top-left bit located at) bit s, bit s+P(0,1) (one bit to the right), bit s+P(1,0) (one bit below), and bit s+P(1,1) (one bit below and one bit to the right) of the parent codeword. The children codewords 1004 are denoted by $c_i(m^{(n+1)})$, where i is within $\{0, 1, 2, 3\}$. FIG. 10 illustrates the spatial relationship between the parent codeword 1002 and the children codewords 1004. Using the estimated or determined confidences of parent codewords in determining the confidence of a child codeword infers that confidences of 4 parent codewords corresponding to bit s and the neighbor bits of bit s may impact the confidence of a codeword for bit s. For $\hat{X}_{\delta s}^{(n+1)} \in \chi^{(n+1)}$ of $x_s^{(n)}$, if the neighbor bits of bit s are the three neighbor bits s+P(0,1), s+P(1,0), and s+P(1,1), then $\hat{X}_{s_{i_j}}^{(n+1)}=m_i^{(n+1)}$ for i within $\{0, 1, 2, 3\}$ and where $m_i^{(n+1)} \in \chi^{(n+1)}$.

Thus, in some aspects of determining the confidence of codewords for neighboring bits of bit s, the confidence of codewords for neighboring bits may affect the confidence of a codeword for bit s. This can be inferred by overlapping codewords of neighboring bits having at least one child codeword in common. For example, four neighboring coarser scale codewords $m_i^{(n+1)}$ may have a child codeword $c_i(m^{i(n+1)})$ in common where the four neighboring coarser scale codewords overlap.

Figure 11:
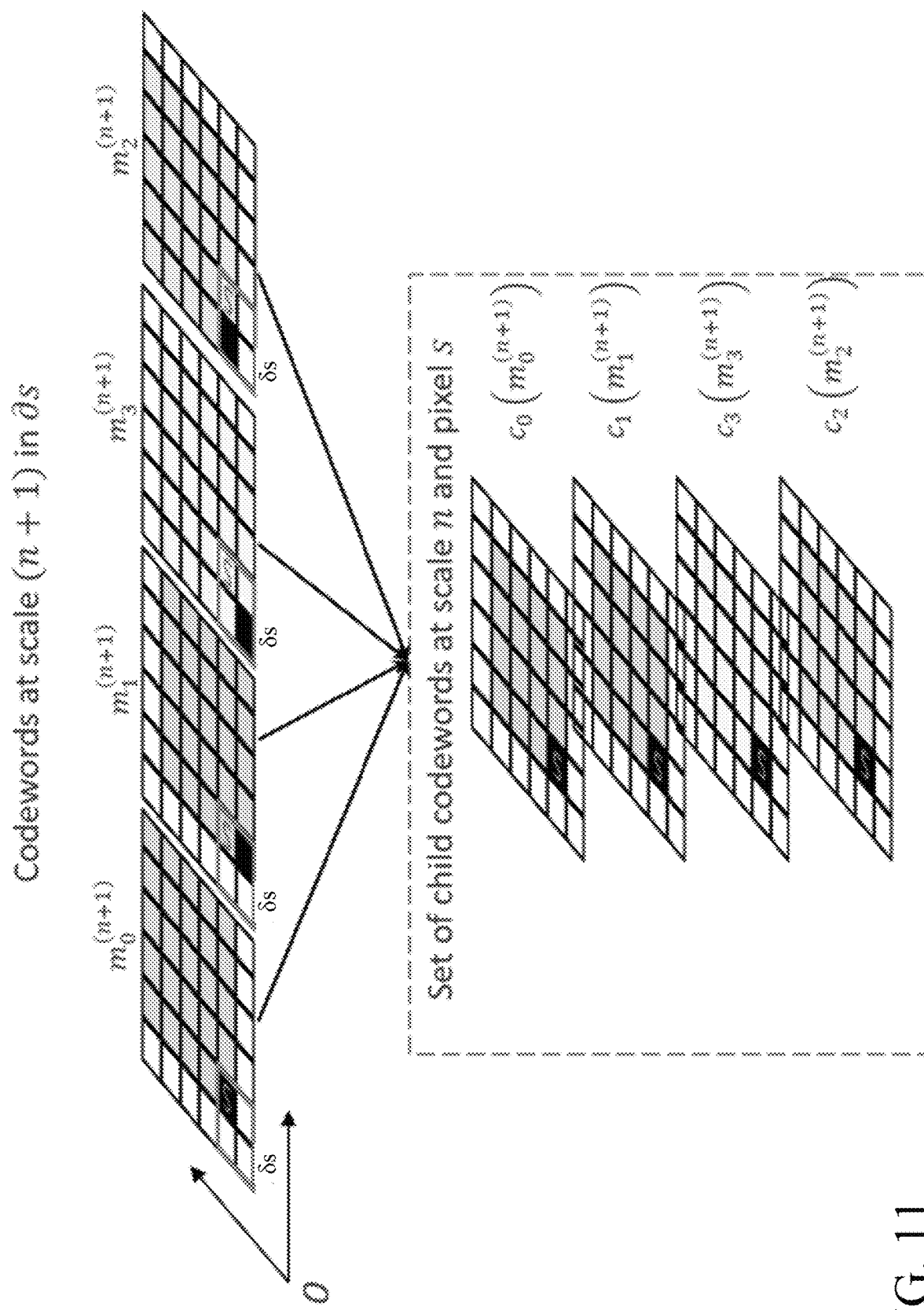
FIG. 11 is a depiction of four overlapping codewords corresponding to four neighboring bits and including the same child codeword.

FIG. 11 is a depiction of four example neighboring codewords illustrated as overlapping such that a child codeword is in common for the neighboring codewords. As a result, the confidences of the neighboring codewords for the neighbor bits of bit s at scale n+1 impact the confidence of the common child codeword at scale n. For example, the confidences may be used to increase the confidence in a child codeword when analyzing smaller portions of the captured image corresponding to bit s at finer scales, such as the device 200 updating the a priori information about the children codewords. For example, the device 200 may increase the confidence for the children codewords as compared to all potential codewords based on the parent codeword confidences for bit s.

In some aspects of increasing the confidence for the common children codewords, if $\theta_0$ and $\theta_1$ denote two positive numbers, with $\theta_1 > \theta_0$, the conditional probability or confidence that $x_s^{(n)}=k^{(n)}$, given the coarse scale codeword confidence $\hat{X}_{\delta s}^{(n+1)}=m^{(n+1)}$, is as depicted in equations (34) and (35) below:

$$p(k^{(n)}|m^{(n+1)}) \triangleq P(X_s^{(n+1)}=k^{(n+1)}|\hat{X}_{\delta s}^{(n+1)}=m^{(n+1)}) \quad (34)$$

$$p(k^{(n)}|m^{(n+1)})=\gamma\theta_1\omega(k^{(n)}|m^{(n+1)})+\gamma\theta_0(1-\omega(k^{(n)}|m^{(n+1)})) \quad (35)$$

where the noise for k(n) given codeword $m^{(n+1)}$ is defined as depicted in equation (36) below:

$$\omega(k^{(n)}|m^{(n+1)}) \triangleq 1-\Pi_{i=0}^{3} \delta(k^{(n)} \neq c_i(m_i^{(n+1)})) \quad (36)$$

As shown by equations (34) and (35), the codewords at scale n have an increased confidence for a patch if they are the children of codewords at coarser scale n+1, and if the patch corresponds to the neighbor bit of a bit whose corresponding patch is analyzed (since $\theta_1 > \theta_0$). The confidence is depicted in equation (37) below:

$$p(k^{(n)}|m^{(n+1)})=\gamma\theta_1 \text{ if } k^{(n)} \in \{c_i(m_i^{(n+1)})\} \quad (37)$$

where variable γ is a normalization vector to ensure the summation of the probabilities or confidences across all codewords at scale n is 1 (the maximum), as depicted in equation (38) below:

$$\Sigma_{k \in \chi^{(n)}} p(k|m^{(n+1)})=1 \quad (38)$$

and variable γ is defined as depicted in equation (39) below:

$$\gamma \triangleq \frac{1}{\theta_0 M^{(n)} + (\theta_1 - \theta_0) \sum_{k \in \chi^{(n)}} \omega(k, m^{(n+1)})} \quad (39)$$

Referring back to equation (31) and having determined term $p(y_s^{(n)}|k^{(n)}, a_s, b_s)$ in equations (32) and (33) and determined term $p(k^{(n)}|m^{(n+1)})$ in equation (35), the device 200 may determine the SMAP estimate for the confidences of the codewords using a sequence of coarse-to-fine scale optimization steps.

FIG. 12 is a depiction of example pseudo code 1200 for an implementation of the multiscale matched filtering process that may be used to perform the optimization in determining a codeword for each bit s. Pseudo code 1200 may be embodied in software, hardware, or a combination of both, and may be performed by device 200.

The device 200 begins by analyzing a portion of the captured image corresponding to bit s at the coarsest scale N. Line 1 of the pseudo code 1200 indicates that n=N, setting the scale to the coarsest scale. In some example implementations, the probability of any scale N codeword existing for the corresponding patch is uniform (there is an equal probability of finding a first codeword as compared to a second codeword, etc.) since no coarser scale and thus no parent codewords exist. The uniform distribution of the probability for the codeword existing is depicted in equation (40) below:

$$p(k^{(N)}|m^{(N+1)}) = p(k^{(N)}) = \frac{1}{M^{(N)}} \forall k^{(N)} \in \chi^{(N)} \quad (40)$$

If the probability distribution is uniform, the confidence of the codewords for each bit s at the coarsest scale N and with the model parameters $a_s$ and $b_s$ at the coarsest scale N may be estimated using, e.g., ML estimation or another estimation technique. Lines 3-5 of the pseudo code 1200 depict an example ML estimation for determining the confidences of the codewords at scale N and a and b for each bit s. After the estimates for the coarsest scale N have been determined by device 200, the device 200 may determine SMAP estimates of the confidence for the remaining finer scale codewords (such as (N−1), (N−2), etc.), such as depicted in line 13. In some example implementations, the determination may be performed for increasingly finer scales until scale 0 is reached, such as depicted by lines 6-17 in pseudo code 1200. After completing the process for a bit s, the device 200 may execute the pseudo code 1200 for other bits of the captured image.

As shown in the pseudo code 1200, the device 200 determines a confidence for each codeword at each scale and for each bit of the captured image (see lines 3 and 13). While not shown in the pseudo code 1200, in some alternative implementations, the device 200 may check at each scale if any valid codewords exist for a bit. For example, the device 200 may determine if one or more confidences determined from line 13 for the codewords at scale n for a bit s are greater than a confidence threshold. In some example implementations, if no valid codeword exists, the device 200 may determine a codeword for the bit s to be a scale n+1 codeword (such as from the determined confidences of the scale n+1 codewords for bit s).

In some examples of determining the confidence of a codeword, the posterior probability of the codeword $\hat{x}_s^{(n)}$, given $\gamma_s^{(n)}$, is determined. An example of the computation at scale n is depicted in equation (41) below:

$$p(\hat{x}_s^{(n)} | y_s^{(n)}, \hat{a}_s^{(n)}, \hat{b}_s^{(n)}) = \frac{p(y_s^{(n)} | \hat{x}_s^{(n)}, \hat{a}_s^{(n)}, \hat{b}_s^{(n)})}{\sum_{k \in \chi^{(n)}} p(y_s^{(n)} | k, \hat{a}_s^{(n)}, \hat{b}_s^{(n)})} \quad (41)$$

In a specific example, the computation at scale 0 is depicted in equation (42) below:

$$p(\hat{x}_s^{(0)} | y_s^{(0)}, \hat{a}_s^{(0)}, \hat{b}_s^{(0)}) = \frac{p(y_s^{(0)} | \hat{x}_s^{(0)}, \hat{a}_s^{(0)}, \hat{b}_s^{(0)})}{\sum_{k \in \chi^{(0)}} p(y_s^{(0)} | k, \hat{a}_s^{(0)}, \hat{b}_s^{(0)})} \quad (42)$$

In some example implementations (such as for 756 in FIG. 7B), the scale 0 codeword may be valid if the confidence (such as the posterior depicted in equation (42)) is greater than a confidence threshold, as depicted in equation (43) below:

$$p(\hat{x}_s^{(n)} | y_s^{(n)}, \hat{a}_s^{(n)}, \hat{b}_s^{(n)}) > T \quad (43)$$

From the pseudocode, a confidence of each scale 0 codeword is determined for the bit s. In some example implementations, the device 200 may determine the codeword for bit s to be the scale 0 codeword with the greatest confidence.

In some other example implementations, a codeword at a scale greater than 0 may be determined for the bit s. As shown in equation (41), the device may determine a confidence of each scale codeword for a bit s. In some examples, the device 200 may compare the confidences of the codewords across the scales to determine the codeword for the bit s. For example, the device 200 may perform a weighted comparison of the confidences for all codewords. The weights may be configured to skew the decision toward finer scale codewords (with scale 0 codewords given the highest weights), but a high enough confidence for a coarser scale codeword may be sufficient for the device 200 to determine the coarser scale codeword for the bit s.

Figure 13:
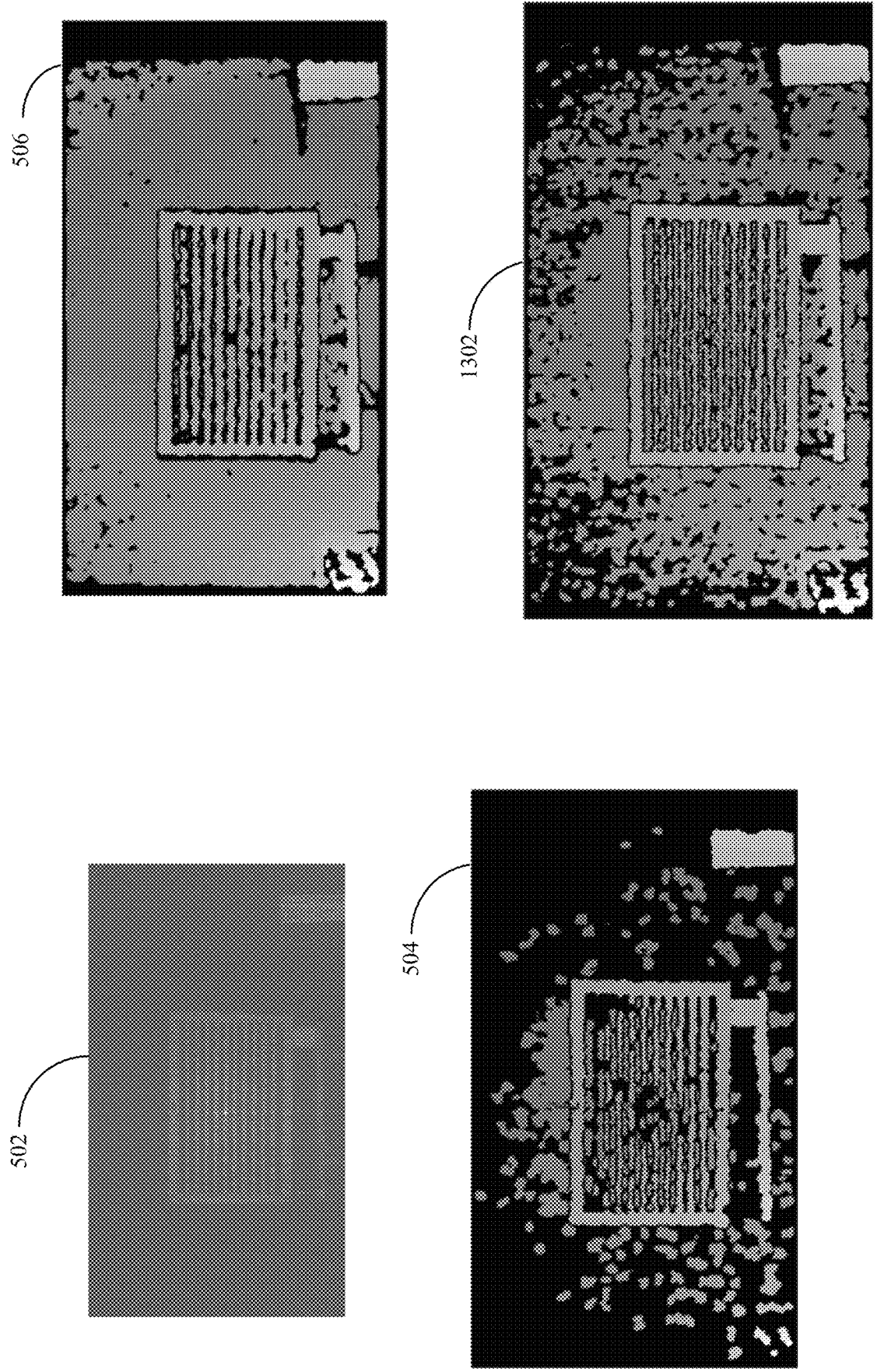
FIG. 13 is a depiction of an example depth map from the captured image depicted in FIG. 5, wherein the codewords used for generating the depth map are identified using multiscale matched filtering with modified sequential maximum a posteriori estimation for different scales.

After determining the codewords for the bits of the captured image, the device 200 may generate a depth map of the scene. FIG. 13 is a depiction of a depth map 1302 from the captured image 502, wherein the codewords are determined using multiscale matched filtering with SMAP estimation for the different scales. As compared to the depth map 504 (generated using 4×4 codewords) and the depth map 506 (generated using 7×7 codewords), the depth map 1302 includes greater resolution than the depth map 506 and includes less portions with invalid data than the depth map 504.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 206 in the example device 200 of FIG. 2) comprising instructions 208 that, when executed by the processor 204 (or the structured light controller 210 or the signal processor 212), cause the device 200 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 204 or the signal processor 212 in the example device 200 of FIG. 2. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. For example, while the structured light system is described as using NIR, signals at other frequencies may be used, such as microwaves, other infrared, ultraviolet, and visible light. Additionally, the functions, steps or actions of the method claims in accordance with aspects described herein need not be performed in any particular order unless expressly stated otherwise. For example, the steps of the described example operations, if performed by the device 200, the structured light controller 210, the processor 204, and/or the signal processor 212, may be performed in any order and at any frequency. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method, comprising:
   receiving a captured image of a scene from a structured light receiver;
   comparing one or more first portions of the captured image to one or more first scale codewords of a codeword distribution, the one or more first portions of the captured image being at a first scale;
   comparing one or more second portions of the captured image to one or more second scale codewords of the codeword distribution, the one or more second portions of the captured image being at a second scale that is finer than the first scale;
   determining a first scale codeword from the one or more first scale codewords for a first portion of the one or more first portions of the captured image or a second scale codeword from the one or more second scale codewords for a second portion of the one or more second portions of the captured image based on a first confidence determined for the first scale codeword and a second confidence determined for the second scale codeword; and
   determining one or more depths in the scene based at least on the determined first scale codeword or second scale codeword.

2. The method of claim 1, further comprising
   determining a confidence of each first scale codeword of the one or more first scale codewords based on comparing the one or more first portions of the captured image to the one or more first scale codewords of the codeword distribution.

3. The method of claim 2, further comprising
   determining a confidence of each second scale codeword of the one or more second scale codewords based on comparing the one or more second portions of the captured image to the one or more second scale codewords of the codeword distribution.

4. The method of claim 1, wherein the first portion of the one or more first portions of the captured image includes the second portion of the one or more second portions of the captured image.

5. The method of claim 1, further comprising determining a confidence of each first scale codeword of the one or more first scale codewords at least in part by performing a modified sequential maximum a posteriori estimation.

6. The method of claim 3, further comprising:
   comparing one or more third portions of the captured image to one or more third scale codewords of the codeword distribution, the one or more third portions of the captured image being at a third scale that is a coarsest scale of the codeword distribution; and
   determining a confidence for each third scale codeword of the one or more third scale codewords based on comparing the one or more third portions of the captured image to the one or more third scale codewords of the codeword distribution.

7. The method of claim 1, wherein determining the first scale codeword or the second scale codeword comprises:
   determining the first scale codeword based on the first confidence being greater than the second confidence.

8. The method of claim 1, wherein determining the one or more depths in the scene comprises generating a depth map of the scene.

9. A device, comprising:
   one or more processors; and
   a memory coupled to the one or more processors and including instructions that, when executed by the one or more processors, cause the device to perform operations comprising:
   receiving captured image of a scene from a structured light receiver;
   comparing one or more first portions of the captured image to one or more first scale codewords of a codeword distribution, the one or more first portions of the captured image being at a first scale;
   comparing one or more second portions of the captured image to one or more second scale codewords of the codeword distribution, the one or more second portions of the captured image being at a second scale that is finer than the first scale,
   determining a first scale codeword from the one or more first scale codewords for a first portion of the one or more first portions of the captured image or a second scale codeword from the one or more second scale codewords for a second portion of the one or more second portions of the captured image based on a first confidence determined for the first scale codeword and a second confidence determined for the second scale codeword; and
   determining one or more depths in the scene based at least on the determined first scale codeword or second scale codeword.

10. The device of claim 9, further comprising instructions that, when executed by the one or more processors, cause the device to perform operations comprising
    determining a confidence of each first scale codeword of the one or more first scale codewords based on comparing the one or more first portions of the captured image to the one or more first scale codewords of the codeword distribution.

11. The device of claim 10, further comprising instructions that, when executed by the one or more processors, cause the device to perform operations comprising
    determining a confidence of each second scale codeword of the one or more second scale codewords based on comparing the one or more second portions of the captured image to the one or more second scale codewords of the codeword distribution.

12. The device of claim 9, wherein the first portion of the one or more first portions of the captured image includes the second portion of the one or more second portions of the captured image.

13. The device of claim 9, further comprising instructions that, when executed by the one or more processors, cause the device to perform operations comprising:
    determining a confidence of each first scale codeword of the one or more first scale codewords at least in part by performing a modified sequential maximum a posteriori estimation.

14. The device of claim 11, further comprising instructions that, when executed by the one or more processors, cause the device to perform operations comprising:
    comparing one or more third portions of the captured image to one or more third scale codewords of the codeword distribution, the one or more third portions of the captured image being at a third scale that is a coarsest scale of the codeword distribution; and
    determining a confidence for each third scale codeword of the one or more third scale codewords based on comparing the one or more third portions of the captured image to the one or more third scale codewords of the codeword distribution.

15. The device of claim 9, wherein the instructions for determining the first scale codeword or the second scale codeword cause the device to perform operations comprising:

determining the first scale codeword based on the first confidence being greater than the second confidence.

16. The device of claim 9, wherein the instructions for determining the one or more depths in the scene cause the device to perform operations comprising:

generating a depth map of the scene.

17. A non-transitory computer-readable medium storing one or more programs containing instructions that, when executed by one or more processors of a device, cause the device to perform operations comprising:

receiving captured image of a scene from a structured light receiver;

comparing one or more first portions of the one captured image to one or more first scale codewords of a codeword distribution, the one or more first portions of the captured image being at a first scale;

comparing one or more second portions of the captured image to one or more second scale codewords of the codeword distribution, the one or more second portions of the captured image being at a second scale that is finer than the first scale, determining a first scale codeword from the one or more first scale codewords for a first portion of the one or more first portions of the captured image or a second scale codeword from the one or more second scale codewords for a second portion of the one or more second portions of the captured image based on a first confidence determined for the first scale codeword and a second confidence determined for the second scale codeword codeword; and determining one or more depths in the scene based at least on the determined first scale codeword or second scale codeword.

18. The non-transitory computer-readable medium of claim 17, further comprising instructions that, when executed by the one or more processors of the device, cause the device to perform operations comprising:

determining a confidence of each first scale codeword of the one or more first scale codewords based on comparing the one or more first portions of the captured image to the one or more first scale codewords of the codeword distribution.

19. The non-transitory computer-readable medium of claim 18, further comprising instructions that, when executed by the one or more processors of the device, cause the device to perform operations comprising:

determining a confidence of each second scale codeword of the one or more second scale codewords based on comparing the one or more second portions of the captured image to the one or more second scale codewords of the codeword distribution.

20. The non-transitory computer-readable medium of claim 17, wherein the first portion of the one or more first portions of the captured image includes the second portion of the one or more second portions of the captured image.

21. The non-transitory computer-readable medium of claim 17, wherein the instructions for determining the first scale codeword or the second scale codeword cause the device to perform operations comprising:

determining the first scale codeword based on the first confidence being greater than the second confidence.

22. A device, comprising:

means for receiving captured image of a scene from a structured light receiver;

means for analyzing one or more first portions of the captured image at a first scale;

means for analyzing one or more second portions of the captured image at a second scale finer than the first scale, wherein the analysis of the one or more second portions is based on the analysis of the one or more first portions;

means for determining, for each of the one or more second portions of the captured image, a codeword from a codeword distribution; and means for determining one or more depths in the scene based on the one or more determined codewords.

23. The device of claim 22, further comprising:

means for comparing a first scale size portion of the captured image to one or more first scale codewords of the codeword distribution; and means for determining a first confidence of each compared first scale codeword for the first scale size portion.

24. The device of claim 23, further comprising:

means for comparing a second scale size portion of the captured image to one or more second scale codewords of the codeword distribution; and means for determining a second confidence of each compared second scale codeword for the second scale size portion, wherein the second confidence is based on one or more first confidences.

25. The device of claim 24, wherein the first scale size portion includes the second scale size portion.

26. The device of claim 25, further comprising:

means for performing a modified sequential maximum a posteriori estimation in determining the second confidence.

27. The device of claim 25, further comprising:

means for comparing a third scale size portion of the captured image to one or more third scale codewords of the codeword distribution, wherein the third scale is a coarsest scale of the codeword distribution; and means for determining a third confidence for each compared third scale codeword, comprising performing a maximum likelihood estimation.

28. The device of claim 24, further comprising:

means for determining the compared second scale codeword with a greatest second confidence for the second scale size portion in determining the codeword for each of the one or more second portion, wherein the second scale is scale 0.

29. The method of claim 1, further comprising:

determining whether at least one of the first scale codeword and the second scale codeword is valid.

30. The method of claim 29, further comprising:

in response to a determination that at least one of the first scale codeword and the second scale codeword is valid, analyzing one or more third portions of the captured image at a third scale that is finer than the second scale; and in response to a determination that none of the at least one of the first scale codeword and the second scale codeword are valid, determining at least one codeword for the one or more first portions of the captured image at the first scale.

31. The method of claim 1, wherein determining the first scale codeword or the second scale codeword comprises:

determining the second scale codeword based on the second confidence being greater than the first confidence.

32. The method of claim 1, wherein the second confidence determined for the second scale codeword is based on the first confidence determined for the first scale codeword.

33. The device of claim 9, wherein the instructions for determining the first scale codeword or the second scale codeword cause the device to perform operations comprising:
determining the second scale codeword based on the second confidence being greater than the first confidence.

34. The device of claim 9, wherein the second confidence determined for the second scale codeword is based on the first confidence determined for the first scale codeword.

* * * * *